US006502652B2

(12) United States Patent
Rogg

(10) Patent No.: US 6,502,652 B2
(45) Date of Patent: Jan. 7, 2003

(54) MOTOR VEHICLE

(75) Inventor: Andreas Rogg, Stockelsdorf (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/825,567

(22) Filed: Apr. 2, 2001

(65) Prior Publication Data

US 2001/0022245 A1 Sep. 20, 2001

Related U.S. Application Data

(63) Continuation of application No. PCT/DE99/03085, filed on Sep. 23, 1999.

(30) Foreign Application Priority Data

| Oct. 2, 1998 | (DE) | 198 45 521 |
| Nov. 9, 1998 | (DE) | 198 51 606 |
| Nov. 10, 1998 | (DE) | 198 61 042 |
| Dec. 16, 1998 | (DE) | 198 58 043 |
| Jul. 19, 1999 | (DE) | 199 33 764 |

(51) Int. Cl.[7] ............................................. B62D 61/06
(52) U.S. Cl. ................... 180/65.2; 180/65.6; 180/65.7
(58) Field of Search ............................ 180/65.2, 65.6, 180/65.7, 65.8, 249, 248; 475/5, 1, 207, 218, 329, 266; 74/866, 336, 745; 192/3.59

(56) References Cited

U.S. PATENT DOCUMENTS 5,577,973 A    11/1996  Schmidt

| 5,703,410 A | * | 12/1997 | Maekawa | 290/40 |
| 6,051,951 A | * | 4/2000 | Arai et al. | 180/65.1 |
| 6,276,472 B1 | * | 8/2001 | Takashima et al. | 180/65.2 |

FOREIGN PATENT DOCUMENTS

| DE | 3246230 A 1 | 6/1984 |
| EP | 0 716 947 A2 | 6/1996 |
| EP | 0 645 271 B1 | 11/1997 |

* cited by examiner

Primary Examiner—Brian L. Johnson
Assistant Examiner—Hau Phan
(74) Attorney, Agent, or Firm—Darby & Darby

(57) ABSTRACT

A motor vehicle has a combustion engine as a primary drive source, generating an engine torque (302) which is transmitted along a power train containing an input shaft (320), a main clutch (308), a gear-shifting transmission (310) with gears (316, 318, 324, 326), shift clutches (328, 330), and an output shaft (322). The power train includes a superimposed additional transmission (312) with a planetary gear device (314), and a secondary drive source in the form of an electric motor/generator with a rotor (342) attached to the ring gear (332) of the planetary gear device (314) and a stator (344) attached to a stationary part of the vehicle. The secondary drive source generates an additional torque (346) to supplement or replace the engine torque (302) as needed, e.g., to eliminate gaps in vehicle traction during gear shifts or to propel the vehicle electrically in stop-and-go traffic. The secondary drive source may also be used in a generator mode, e.g., to recycle energy from decelerating or coasting downhill.

101 Claims, 11 Drawing Sheets

MOTOR VEHICLE

This application is a continuation of PCT/DE99/03085, filed Sep. 23, 1999.

BACKGROUND OF THE INVENTION

The invention relates to a motor vehicle with at least one primary drive source, and it also relates to a method of operating the motor vehicle.

Motor vehicles with one primary drive source belong to the known state of the art.

In motor vehicles according to the known state of the art, a drive torque is generated by a combustion engine. The drive torque is introduced into a transmission by way of a transmission input shaft. The transmission has different shift levels corresponding to different transmission ratios. The transmission ratio, in turn, determines the amount of torque delivered at the output shaft of the transmission. By way of the transmission output shaft, the differential, and the vehicle axle(s), the torque is transmitted to the wheels and tires of the vehicle which, through their contact to the road, will cause the vehicle to move. Motor vehicles according to this concept have proven themselves for a long time.

Nevertheless, motor vehicles of the known state of the art still have certain characteristics that leave a desire for improvement.

For example, when the transmission is shifted from one gear to another, there is a time gap in vehicle traction because the power train is interrupted during the shift process. This interruption of the tractive force is experienced by the driver as a "nodding effect". The interruptions in the power flow further represent an inefficient use of engine power, as the output shaft receives no power during the time phases when the traction is interrupted.

OBJECT OF THE INVENTION

It is therefore the object of the present invention to provide a motor vehicle as well as a method of operating a motor vehicle in which an improved degree of efficiency, an increased comfort level for the driver and passengers, and increased flexibility of the power train are combined with reductions in the cost and complexity of the manufacturing process as well as reduced operating costs and improved driving characteristics of the vehicle.

SUMMARY OF THE INVENTION

According to the invention, the foregoing objective is met by a vehicle which, in addition to a primary drive source and a driving shaft or input shaft, is equipped with an additional superimposed drive source, which will also be referred to as the second or secondary drive source. In this arrangement, the primary drive source, for example a combustion engine, generates an input quantity such as an input torque. The input torque can be transmitted to a driven shaft or output shaft rotating at an output rpm rate. The superimposed drive source allows the input/output ratio to be varied, in particular between the input torque and the output torque or the input rpm rate and the output rpm rate.

While the primary drive source is typically a combustion engine, the superimposed drive source is, for example, an electro-mechanical energy converter, turning electrical energy into mechanical energy and/or vice versa. A preferred mode of operation of the energy converter is as an electrical generator, so that energy can be recovered from the power train of the vehicle.

The invention increases the flexibility of a motor vehicle with a primary drive source. In a motor vehicle equipped according to the invention, the time gaps in the tractive force can be shortened or eliminated. For example, the invention offers the possibility of activating the superimposed drive source during a gear shift, i.e., when vehicle traction is interrupted by un-clutching or disengaging the gear-shift transmission, so that during the interruption, the driving torque is provided by the superimposed drive source, e.g., an electro-mechanical energy converter.

Preferably, such a concept includes the possibility of controlling the ratio between the input quantity and the output quantity.

According to the invention, the foregoing objective is further met by a vehicle which, in addition to a primary drive source and a driving shaft, is equipped with an additional superimposed drive source and with a means of influencing one of the "border-interface" quantities, i.e., the input quantity (e.g., the engine rpm rate or engine torque) or the output quantity (the output rpm rate or output torque). Preferably, the influence is exercised through a control process. The concept of influencing the border-interface quantities in accordance with the invention means in particular that as a result of the activity of the superimposed drive source, the input or output quantity will at least temporarily take on a value that is different from a value that would occur in the absence of the superimposed drive source, if the primary drive source were working at the same operating point.

According to the invention, the foregoing objective is further met by a vehicle with at least one drive source, in particular a combustion engine, to generate at least one input quantity such as an input torque and at least one output shaft to deliver an output quantity such as an output rpm rate, and with at least a part of a planetary gear set operative at least part of the time and interposed at least partially between the primary drive source and the output shaft, where at least one substantially rotatable element of the planetary gear set is connected to a second drive source which can generate a second input quantity, in particular a second input torque.

In other words, a vehicle according to the invention is equipped with at least two drive sources, one of which is a combustion engine, and at least one second drive source is coupled to the power train through a rotatable element of a planetary gear set such as ring gear, planet carrier, planet gear or sun gear.

Thus, according to the invention, a combustion engine can, by way of a gear set, turn the sun gear of a planetary set at a certain rpm rate, while an electro-mechanical energy converter coupled to the ring gear of the planetary set introduces an additional, superimposed torque or rpm rate so that the output rpm rate is increased as a result of the activity of the electro-mechanical energy converter In an embodiment of the invention as described in the preceding paragraph, the planetary gear set may have, e.g., one ring gear and/or one sun gear and/or at least one planet gear and/or at least one planet carrier. Instead of gears, the planetary set may also have friction wheels as another preferred way of meeting the object of the invention.

According to the invention, the planetary set may have all of the aforementioned elements, i.e., a ring gear, a sun gear, at least one planet gear, as well as a planet carrier. However, the preferred solutions according to the invention also include designs where at least some of these elements are omitted. For example, the scope of the invention also includes planetary sets with only a ring gear, at least one planet gear and a planet carrier. Or, as another example, a planetary set according to the invention could have only a sun gear, at least one planet gear, and a planet carrier. Under the invention, there is substantially no limit in regard to the number of planet gears. Nevertheless, in some arrangements there can be a preference for certain numbers of gears. For example, planetary sets with three planet gears are preferred. However, this does not preclude the use of only one or only two planet gears. Another especially preferred arrangement has four planet gears. The scope of preferred solutions further includes planetary sets with five, six, seven, eight, nine or ten planet gears. However, no limitation on the number of planet gears is implied in mentioning these possibilities.

According to a particularly preferred embodiment of the invention, the motor vehicle has two transmission devices, one of which is a superimposed or secondary transmission. Particularly preferred are arrangements where an rpm rate or a torque of one transmission device is superimposed on an rpm rate or torque of the other transmission device.

According to a particularly preferred embodiment of the invention, at least one segment of the power train of the vehicle has two branch power trains operating in parallel. One example consists of an arrangement whereby a torque or a rotary motion is transmitted from a first shaft to a second shaft by way of two transmission devices working in parallel, where the first shaft receives a torque or rotary motion from a primary drive source. At least a part of the energy or power associated with the torque and rotary motion can be transmitted to the second shaft through at least one of the transmission devices. Preferably, at least one shaft of the transmission devices is coupled to a second drive source which is, likewise, operable to provide energy or power to the second shaft, preferably by way of one of the transmission devices.

With particular preference, the invention is used in embodiments where at least a primary drive source is operable to provide a torque, or energy, to a drive shaft of the vehicle by way of at least a first transmission device, particularly of a type that is shiftable in different steps. At least one second drive source is arranged to provide energy, preferably by way of the second transmission device, to a drive shaft, preferably the same drive shaft as mentioned above. As this embodiment shows, the invention is not limited to parallel arrangements with at least two junction points in the power path, in which the power path separates into two parallel branches at a first junction point and the branches are reunited at the second junction point.

Also specifically included under the scope of the invention are "open" parallel arrangements where, e.g., one branch originates from a first drive source, the other branch originates from a second drive source, and the two branches run parallel up to a junction point where they are united into a single power train.

In accordance with a particularly preferred embodiment of the invention, at least one of the transmission devices includes a planetary gear set.

It is preferred according to the invention to equip a vehicle with at least two drive sources to produce the motive power for a rotary output element and thus for the driving wheels of the vehicle, where one of the drive sources is a combustion engine and one of the drive sources is an electro-mechanical energy converter.

In a particularly preferred embodiment of the invention, a vehicle with at least one drive source has at least one energy-storing device that is operable to receive energy from the drive train at least during part of the time. As an example, the energy storing device can be an electricity-generating device.

Preferably, the energy-storing device is configured so that it extracts energy from the power train during some time phases and delivers energy into the power train during other time phases. The power train may be designed, for example, to be energizable by a combustion engine and an electro-mechanical energy converter. The preferred mode of operation is for the electro-mechanical energy converter to take energy out of the power train, i.e., to function as a recipient of energy, under certain predetermined operating situations.

As a particularly preferred concept, the energy-storing device can at least during part of the time take in energy generated by decelerating the vehicle. With particular preference, the energy taken in by the energy-storing device can at least in part be returned to the power train in accordance with a predetermined operating characteristic. Likewise preferred is an arrangement where the electro-mechanical energy converter can be operated at least part of the time as a motor and part of the time as a generator.

According to a preferred embodiment of a vehicle according to the invention, the vehicle is equipped with at least two drive sources to provide the motive power to the driving wheels of the vehicle, where the two drive sources can be active simultaneously during at least part of the time, so that the motor vehicle is powered by both drive sources at the same time.

It is likewise preferred, to equip a motor vehicle with at least two drive sources, where during certain time phases one of the drive sources is inactive while a second drive source is active substantially during the same time phase, so that the motor vehicle has time phases when it is powered by part of the drive sources.

It is also preferred to equip the motor vehicle with a drive source that is an electro-mechanical energy converter. With particular preference, the electro-mechanical energy converter is designed so that it can provide motive power to the vehicle at substantially any time. For example, this includes at least certain times other than the start-up phase of the vehicle.

As an example of the inventive concept, in a vehicle with a gear-shift transmission and a start-up clutch where the power train is interrupted at least part of the time during a gear change, the vehicle can during the interruptions be powered by a superimposed secondary drive source such as an electro-mechanical energy converter. The invention provides, for example, the possibility of smoothing out the torque profile or rpm profile of any elements in the power train. For example, during phases when vehicle traction would otherwise be interrupted, the electro-mechanical energy converter can add a superimposed torque or rotary motion to a power train component to prevent a sudden loss of traction during a power train interruption. For example, a torque profile or rpm profile can be smoothed out in such a manner that during the time phase where the traction would otherwise abruptly collapse, the profile will instead show a monotonic increase or decrease of the rpm rate or torque.

The invention makes it possible to prop up (i.e., to prevent an abrupt decrease) of the profile curve of, e.g., the engine torque or the clutch torque. According to a preferred embodiment of the invention, a motor vehicle is equipped with at least two drive sources operating substantially in series to drive the wheels of the motor vehicle.

It is further preferred in embodiments of the invention, if at least two transmission devices work in series to operate the motor vehicle or, more specifically, to supply torque to the driving wheels. It is also preferred to arrange at least two transmission devices in the power train of the vehicle between the combustion engine and the differential.

With preference, the transmission devices are of a kind that can be shifted between different ratios.

Preferred are transmissions that can be shifted between at least two ratios. Particularly preferred embodiments include solutions where the ratios of the first transmission device and of the second transmission device can be shifted dependent on each other, as well as solutions where they are shifted independent of each other.

Particularly preferred solutions further include those where at least a first and second transmission device are arrange in series in the power train, but parallel arrangements of at least a first and second transmission device are also among the preferred embodiments.

It is to be noted that the term transmission or transmission device in the context of the present invention is used in the customary sense of a device that has at least one wheel, and in particular at least one tooth-rimmed gear.

In a particularly preferred embodiment of the invention, at least one transmission device includes a planetary gear set.

It is likewise preferred if at least one of the transmission devices can be actuated by way of a clutch. For example, in one preferred embodiment, different ratio levels or gear levels of the transmission device can be shifted through a clutch. Also as a preferred concept, a transmission-associated clutch device of the kind just mentioned can be used to open up (i.e., interrupt) the power train. For example, it is proposed in accordance with the invention that the power train can be interrupted by a clutch device in the area of the transmission. In particular, the invention provides that the transmission device can be put into a neutral position by means of a clutch. The invention places no limitation on how the clutch is to be arranged in the power train. Preferred embodiments can have a plurality of clutches arranged in the power train.

With particular preference, embodiments of the invention have torque-transmitting devices of any kind arranged in the power train, among which a clutch represents only one special case. For example, in a particularly preferred embodiment of the invention, a torque-transmitting system in the power train includes a torque converter such as, e.g., a hydrodynamic torque converter.

According to a preferred embodiment of the invention, at least one torque-transmitting device, specifically at least one clutch, is arranged concentrically around a shaft of the power train, e.g., directly on the shaft.

In accordance with a particularly preferred embodiment of the invention, the first transmission device which, in particular, serves to shift the different gear levels, includes an arrangement of spur gears with external tooth profiles.

Also among preferred solutions, the second transmission device which, in particular, functions as a superimposed transmission device, includes a planetary gear set. The combination of first and second transmission devices of the types just mentioned is particularly preferred.

Preferred is a design where the sun gear of a planetary gear set in the power train is coupled through a substantially rotation-locked constraint to a shaft on the upstream side of the torque flow. Solutions where the sun gear is coupled to a shaft on the downstream side are also particularly preferred. Also in preferred embodiments, the ring gear of a planetary gear set is arranged, e.g., parallel to a further transmission device, and is coupled through a substantially rotation-locked constraint to a shaft on the upstream side of the torque flow. Arrangements where the ring gear is coupled to a shaft on the downstream side are likewise among the preferred solutions.

Also preferred is a design where a planet gear of a planetary gear set in the power train is coupled through a rotation-locked constraint to a shaft on the upstream side of the torque flow. Solutions where a planet gear is coupled to a shaft on the downstream side are also particularly preferred.

In a particularly preferred embodiment, the planet carrier of a planetary gear set is coupled through a rotation-locked constraint to a shaft on the upstream side of the torque flow. Also as a preferred solution, the planet carrier of a planetary gear set arranged at least partially in the power train of a motor vehicle is coupled to a shaft on the downstream side of the power train.

Preferred is further a design where the sun gear of a planetary gear set in the power train is rotatably supported on a shaft on the upstream side of the torque flow. Configurations where the sun gear is rotatably supported on a shaft on the downstream side are likewise among the preferred solutions, as are configurations where sun gears of planetary gear sets are rotatably supported on both an upstream shaft as well as on a downstream shaft in the power train.

Also in preferred embodiments, the ring gear of a planetary gear set is rotatably supported on a shaft on the upstream side of the torque flow. Arrangements where the ring gear is rotatably supported on a shaft on the downstream side are likewise among the preferred solutions.

Also preferred is a design where a planet gear of a planetary gear set in the power train is rotatably supported on a shaft on the upstream side of the torque flow. Solutions where a planet gear is rotatably supported on a shaft on the downstream side are also particularly preferred.

In a particularly preferred embodiment, the planet carrier of a planetary gear set is rotatably supported on a shaft on the upstream side of the torque flow. Also as a preferred solution, the planet carrier of a planetary gear set rotatably supported on a shaft on the downstream side of the power train.

Also particularly preferred are arrangements resulting from a combination of the individual planetary configurations discussed above. As an example, a ring gear of a planetary gear set can be mounted on a shaft on the upstream side of a power train either with or without the freedom of rotation relative to the shaft, while the sun gear is mounted on a shaft on the downstream side of a power train likewise either with or without the freedom of rotation relative to the shaft. Likewise preferred are designs where transmission ratios are shiftable between individual gears of a planetary set and individual shafts of power train such as, e.g., a shaft on the upstream side or a shaft on the downstream side of the power train.

For example, according to the invention, the planet carrier of a planetary gear set can be coupled by way of at least one gear stage to an upstream shaft of the power train. Likewise preferred are solutions where the planet carrier is coupled to a downstream shaft in the power train.

A particularly preferred embodiment of the invention has means of establishing an at least temporarily rotation-locked and releasable connection between an upstream or downstream shaft of the power train on the one hand and the sun gear, the ring gear, a planet gear, or the planet carrier of the planetary gear set.

According to a particularly preferred embodiment of the invention, the ring gear of a planetary gear set is arranged in the torque flow path between a motion-generating device and a planetary gear arrangement. The term torque flow in the present context should be understood in a wider sense, encompassing for example also a flow of power or energy in general. A motion-generating device in the sense of the present invention is in particular an energy source that imparts movement to at least one component, or puts the component from a state of rest into a state of motion. The energy source is not limited to any particular types of energy sources. For example, a manually operable motion-generating device is included among energy sources in the sense of the present invention.

In accordance with a particularly preferred embodiment of the invention, the ring gear of a planetary gear set is designed to be coupled at least temporarily to an electro-mechanical energy converter. For example, a stator of an electro-mechanical energy converter could be arranged to concentrically surround and drive the ring gear of a planetary gear set, where the rotor would be incorporated in the ring gear. Likewise preferred is a solution where a rotor is coupled to the ring gear of a planetary gear set. Analogously, according to a particularly preferred embodiment of the invention, the planet carrier of a planetary gear set could be driven by an electro-mechanical energy converter. As a further preferred concept, the configurations just discussed could be made operable to convert mechanical motion into electrical energy.

Particularly preferred are configurations where the magnitude of the stator current can be set or controlled.

In accordance with a particularly preferred embodiment of the invention, a planetary gear set is arranged between a first transmission device and a combustion engine at least partially in the torque flow path.

Also in preferred embodiments, a clutch device such as in particular a start-up clutch is arranged in the power train between the combustion engine and the drive shaft.

According to a particularly preferred embodiment of the invention, a second transmission device, particularly a planetary gear device or a transmission containing a planetary gear device, is arranged on the side of the clutch that faces towards the engine. The clutch in this arrangement is preferably a start-up clutch.

According to a preferred embodiment of the invention, the second transmission device, preferably constituted by or containing a planetary gear set, is arranged on the side of the clutch that faces away from the engine, the clutch being, e.g., a start-up clutch.

Also preferred is an arrangement with two or more transmission devices in the power train of a motor vehicle, at least some of them arranged to the same side of a clutch which is, e.g., a start-up clutch.

According to a particularly preferred embodiment of the invention, at least a portion of the power train can be opened or closed by way of a clutch device in the area of the planetary gear set, with the clutch device and the sun gear of the planetary set being connected to different shafts.

According to a particularly preferred embodiment of the invention, a transmission input shaft is arranged in the torque-flow path between a combustion engine and the first transmission device which in particular serves to shift between different gears. The transmission input shaft in this embodiment is essentially concentric with the sun gear of a planetary gear set that is preferably coupled to a second drive source.

Also among the preferred concepts of the invention is a substantially analogous arrangement where a transmission output shaft is arranged in the torque-flow path between the first transmission device and at least one output shaft. The transmission output shaft in this embodiment is essentially concentric with the sun gear of a planetary gear set.

Preferred arrangements include those where the sun gear of the planetary gear set is mounted on the transmission input shaft as well as those where it is mounted on the transmission output shaft.

In a particularly preferred embodiment of the invention, a clutch device with a self-adjusting clutch is arranged in the power train of a motor vehicle. The clutch can be configured so that it adjusts itself to wear by reducing the force required to disengage the clutch.

A self-adjusting clutch of the kind just discussed is preferably force-controlled. With particular preference, this kind of self-adjusting clutch is displacement-controlled.

According to a particularly preferred embodiment of the invention, a stepwise-shifting transmission is arranged in the power train of the motor vehicle. With particular preference, the first transmission device consists of this step-wise shifting transmission.

Also among preferred solutions, a continuously variable transmission is arranged in the power train of the motor vehicle. Preferably, this continuously variable transmission represents the first transmission device.

Further among preferred solutions, the first transmission device may be configured as an automatic transmission.

According to a particularly preferred embodiment of the invention, an automated gear-shifting transmission is arranged in the power train of the motor vehicle. With particular preference, the first transmission device is configured as an automated gear-shifting transmission.

Further preferred are embodiments where a clutch device in the power train is configured as an electronically controlled clutch device. For example, the electronically controlled clutch may be a clutch device of the kind distributed by the applicant under the name Elektronisches Kupplungs-Management (EKM) or Electronic Clutch Management (ECM).

It is further preferred if at least one dual-mass flywheel is arranged in the power train of a motor vehicle according to the invention. With particular preference, a dual-mass flywheel of this kind is combined with a clutch device, e.g., a self-adjusting clutch device, in one assembly module to be installed as a complete unit. In preferred designs, the dual-mass flywheel and the clutch device are screwed together.

Preferred are concentric arrangements of the clutch device and the dual-mass flywheel.

Also preferred are arrangements where the clutch device and the dual-mass flywheel adjoin each other at least partially in the radial direction.

According to a particularly preferred embodiment of the invention, the vehicle is equipped with a device to reverse the sense of rotation of the drive torque.

With particular preference, the reversing device includes a transmission device and/or a clutch device.

Further among preferred concepts, a motor vehicle according to the invention is equipped with a controller device which, for example, can take control over a transmission clutch and/or an electro-mechanical energy converter and/or a start-up clutch.

In accordance with a particularly preferred embodiment of the invention, a motor vehicle with at least one combustion engine to propel the vehicle and at least one second drive source (such as an electro-mechanical energy converter) for operating the vehicle, is designed to be propelled at least part of the time by the power of the combustion engine alone. This means that the drive torque is generated at least part of the time by the combustion engine.

According to a particularly preferred embodiment of the invention, a motor vehicle equipped with a combustion engine and an electro-mechanical energy converter and operable by both of these drive sources is designed to be propelled at least part of the time by the electro-mechanical energy converter alone.

It is further preferred if the transmission ratio of the motor vehicle can be controlled by the electro-mechanical energy converter.

Specifically with the latter concept, it is preferred if the electro-mechanical energy converter is configured to act on a planetary gear device that is part of the power train, preferably in a serial arrangement. The rpm rate and torque of a downstream shaft in the power train that is also powered by the combustion engine can, for example, be controlled by an electro-mechanical energy converter acting on one of the rotary elements of the planetary set.

It is further preferred if a motor vehicle equipped with a combustion engine and an electro-mechanical energy converter can be propelled by the power of both of these drive sources simultaneously.

With particular preference, the vehicle is designed so that the output torque is produced by both of these drive sources.

It is further preferred that the electro-mechanical energy converter is operable as a generator at least part of the time.

It is further preferred if the energy generated by deceleration of the vehicle can be fed back to the electro-mechanical energy converter.

It is also preferred in a motor vehicle with a combustion engine and an electro-mechanical energy converter, both serving as drive sources of the vehicle, if the vehicle can be propelled by the electro-mechanical energy converter at least part of the time and at least in the forward-driving mode.

It is particularly preferred in a motor vehicle with a combustion engine and an electro-mechanical energy converter, both serving as drive sources of the vehicle, if the vehicle can be propelled by the electro-mechanical energy converter at least part of the time and at least in the reverse driving mode.

In a particularly preferred embodiment of the invention, in which an electro-mechanical energy converter is coupled at least part of the time into the power train of the motor vehicle, the electro-mechanical energy converter is operable as a generator and/or as a motor that can perform the function of starting the engine.

With particular preference, the vehicle is equipped additionally with a conventional starter motor.

With particular preference, the electro-mechanical energy converter has the capability to start the combustion engine when the vehicle is standing still. Further among preferred possibilities, the electro-mechanical energy converter may be provided with the capability to start the combustion engine while the vehicle is moving. If the combustion engine is started while the vehicle is in motion, the abrupt change in the torque flow due to the initial engine compression can be compensated by activating the electro-mechanical energy converter so that it contributes torque to the power train during the engine-starting phase.

A particularly preferred use of the electro-mechanical energy converter is to intervene and/or to bridge the gap when traction is interrupted during shift phases in a gear-shifting transmission. This means in particular that the "collapse" or temporary decline of the engine torque or clutch torque, which typically occurs with known conventional shift transmissions, can be compensated by activating the electro-mechanical energy converter.

In particular, by activating the electro-mechanical energy converter, it is possible to achieve a substantially monotonic torque profile between given points of a torque vs. time diagram of the clutch device or the engine at the beginning and end of a shift process. Instead of a monotonic profile, it is also possible by means of the superimposed assistance of the electro-mechanical energy converter to achieve a torque profile corresponding to an arbitrarily prescribed characteristic.

For example, it can be prescribed as an operating constraint that the torque always has to stay above a given threshold value. The electro-mechanical energy converter can be activated to assure that the torque will meet this threshold condition. As a part of this concept, it is particularly preferred if the respective amounts of torque generated by the combustion engine and the electro-mechanical energy converter are monitored and controlled by a torque-harmonizing controller device.

In a particularly preferred embodiment of a motor vehicle with a combustion engine as well as an electro-mechanical energy converter as drive sources, the electro-mechanical energy converter is provided with the capability of compensating and/or isolating and/or damping oscillations entering the power train either from the drive source or from the output end.

According to a particularly preferred embodiment of an inventive motor vehicle with a combustion engine and an electro-mechanical energy converter arranged in the drive train, the sense of rotation of the one or more drive shafts is reversible by means of the electro-mechanical energy converter and/or the combustion engine. For example, by additively engaging the second of these drive sources, it is possible to generate a resulting torque in the drive shaft acting in the opposite sense of rotation from the previously existing torque.

With particular preference, the electro-mechanical energy converter is designed to work with external excitation.

It is further preferred if the electro-mechanical energy converter is configured as a reluctance motor, asynchronous motor, EC motor, DC shunt motor, synchronous motor, or stepper motor.

It is further preferred according to the invention if the planet carrier of a planetary gear set in the power train of the vehicle is configured as a deep-drawn die-cut component.

It is further preferred according to the invention if the ring gear of a planetary gear set in the power train of the vehicle is configured as a deep-drawn die-cut component.

The object of the invention is further achieved through a method of operating a motor vehicle with two drive sources, in particular a combustion engine and an electro-mechanical energy converter. The inventive method is distinguished in that it includes the step of operating the electro-mechanical energy converter in a generator mode at certain predetermined times, i.e., in a mode where mechanical energy is extracted from the power train and converted into electrical energy. Also preferred is a mode where the electro-mechanical energy converter is operated during part of the time as a generator and during part of the time as a motor.

As a general note, wherever the word "or" is used in the present context in reference to features of the invention, it may be used either in the Boolean sense (one or the other or both) or as an exclusive "or" (one or the other but not both).

As a further general note, where the term "control" is used within the context of the present invention, it should be understood in a broad sense, i.e., encompassing closed-loop types of regulation and/or control as defined in DIN (German Industry Standards).

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

In the following detailed description, the invention is explained on the basis of embodiments illustrated in the attached drawings, which represent examples only and are in no way meant to exclude other possibilities encompassed within the scope of the invention.

In the drawings.

DETAILED DESCRIPTION OF PREFERRED EMBODIMENTS

Figure 1:
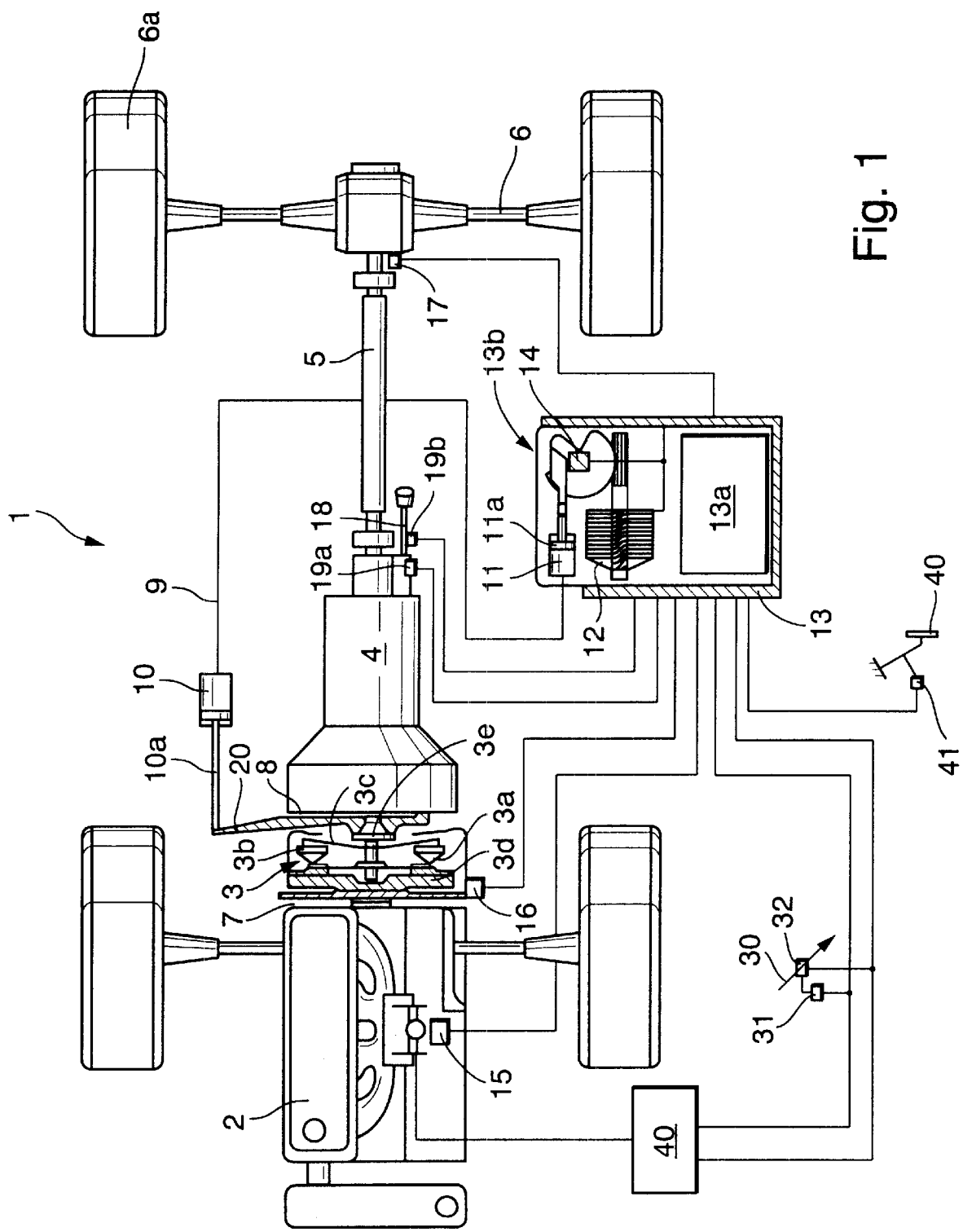
FIG. 1 exemplifies a first embodiment of the invention in a schematic form of representation.

FIG. 1 gives a schematic view of a vehicle 1 with a drive source 2 such as a motor or combustion engine. Also shown in the power train of the vehicle is a torque-transmitting system 3 and an arrangement 4 with a transmission. The torque-transmitting system 3 in this example is arranged at a place in the torque-flow path between the engine and the transmission. The drive torque generated by the engine is transmitted by way of the torque-transmitting system to the transmission and from the transmission 4 downstream by way of a drive shaft 5 and a driving axle 6 to the wheels 6a.

The arrangement 4 with the transmission is represented schematically as a black box. The box 4 represents in particular the portion of the power train which in the FIGS. 3 through 12 lies between the start-up clutch and the inertial masses and moments of the dynamic system constituted by the vehicle. The arrangement or block module 4 includes in particular a transmission that can be shifted between different gears and it also includes a planetary gear set. It should be noted that the planetary gear arrangement can also be interposed between the combustion engine and the start-up clutch, as illustrated in FIG. 1.

The torque-transmitting system 3 is configured as a clutch, such as a friction clutch, a laminar disc clutch, magnet-powder clutch or converter-bypass clutch. The clutch can be self-adjusting as well as wear-compensating. The arrangement 4 with the transmission includes for example a manual shift transmission that can be shifted between different gear levels. However, in keeping with the general concept of the invention, the transmission can also be an automated shift transmission in which the shifting is performed by means of at least one actuator. The term "automated shift transmission" further encompasses an automated transmission that is shifted with an interruption in the tractive force and in which the shifting process is performed by means of at least one actuator.

Furthermore, an automatic transmission may also be used, where the term "automatic transmission" means a transmission that shifts substantially without an interruption in the tractive force and which, as a rule, is based on planetary gear stages.

As a further possibility, a continuously variable transmission, such as a cone-pulley transmission, may be used. The automatic transmission could also be equipped with a torque-transmitting system 3 arranged on the downstream side of the power train. The torque-transmitting system can further be configured as a start-up clutch and/or reverse drive clutch and/or safety clutch in which the amount of torque transmitted can be controlled to meet a targeted value. The torque-transmitting device can be a dry friction clutch, or a wet friction clutch operating, e.g., in a fluid, or it can also be a torque converter.

The torque-transmitting system 3 has an upstream side 7 and a downstream side 8 in relation to the flow of torque in the power train. Torque is transmitted from the upstream side 7 to the downstream side 8 when a compressive contact force is applied to the clutch disc 3a by means of the pressure plate 3b, the diaphragm spring 3c, the release bearing 3e as well as the flywheel 3d. The compressive force is applied and removed through the release lever 20 by means of an actuator device.

The torque-transmitting system 3 is controlled by means of a control system or controller device 13 which may include the electronic control module 13a and the actuator 13b. In another advantageous design, the actuator and the electronic control module may be accommodated in two different assembly units or housings.

The controller device 13 can include the control and power electronics for the electric motor 12 of the actuator 13b. This configuration allows an advantageous spatial arrangement where space is needed only for the actuator and associated electronics. The actuator has a drive motor 12 such as an electric motor which acts through a gear mechanism, e.g., a worm gear, spur gear, crank mechanism or a screw spindle drive on a master cylinder 11. The actuator can interact with the master cylinder either directly or through connecting rods.

The movement of the output element of the actuator, such as the master cylinder piston 11a, is detected by a clutch displacement sensor 14 which registers the position, speed, or acceleration of a quantity that is in a proportional relationship to the position or degree of engagement, or the speed or acceleration of the clutch. The master cylinder 11 is connected to the slave cylinder 10 by way of a pressure medium conduit 9, such as a hydraulic line. The output element 10a of the slave cylinder is operatively connected with the release lever or releasing means 20, so that a movement of the output element 10a of the slave cylinder will, in turn, cause the releasing means 20 to move or tilt in order to control the amount of torque that is transmitted through the clutch 3.

The actuator 13b for controlling the amount of torque transmitted through the torque-transmitting system 3 can be designed to work through the action of a pressure medium, i.e., it can be equipped with master and slave cylinders for the pressure medium. The choice of pressure media includes, e.g., hydraulic and pneumatic media. The master cylinder may be actuated by means of an electric motor 12, e.g., under electronic control. The actuator 13b may also be driven by a power source other than an electric motor, e.g., by a hydraulic drive source. It is further conceivable to use magnetic actuators to control a position of an element.

In a friction clutch, the control of the amount of torque that can be transmitted is performed by applying a controlled amount of pressure on the friction linings of the clutch disc between the flywheel 3d and the pressure plate 3b. The amount of force on the pressure plate, and thus the pressure on the friction linings, is controlled through the position of the releasing means 20, e.g., a release fork or a central releasing device, whereby the pressure plate can be moved to and maintained at any position between two end positions. One end position corresponds to a completely engaged clutch position, while the other end position corresponds to a completely disengaged clutch position. To set the clutch so that it will transmit a torque of, e.g., lesser magnitude than a currently delivered engine torque, the pressure plate 3b can for example be set to a position corresponding to an intermediate range between the two end positions. With the controlled actuation of the releasing means 20, the clutch can be fixed at this position. However, the clutch can also be enabled to transmit amounts of torque exceeding the actually delivered engine torque by a defined margin. This allows the currently available amounts of engine torque to be transmitted, while torque fluctuations in the power train, e.g., in the form of transient peak amounts of torque, are damped and/or isolated.

To run the torque-transmitting system, in the sense of controlling or regulating the amount of torque, the relevant operating quantities of the entire system are at least during part of the time monitored by sensors that deliver the current status data, signals and measurement values required for the control. This information is processed by the control unit, and there can also be a signal connection to other electronic units, e.g., electronic modules associated with the engine or an anti-lock braking system (ABS) or an anti-slip regulation system (ASR). The sensors perform the functions of, e.g., detecting rpm rates such as wheel and engine rpm rates, the position of the engine-load control lever, the throttle valve position, the gear position of the transmission, an intent of the driver to shift gears, and other vehicle-specific characteristic quantities.

FIG. 1 illustrates a vehicle in which a throttle-valve sensor 15, an engine-rpm sensor 16 as well as a speed sensor 17 are used and are transmitting measurement values and other information to the control unit. The electronic module, e.g., a computer module, of the control unit 13a serves to process the system input quantities and to transmit control signals to the actuator 13b.

The combustion engine can be controlled electronically by means of a throttle valve actuator. The throttle valve control allows the engine-load lever position and/or the throttle valve position to be controlled, e.g., by means of a characteristic correlation of values stored in a memory module of the control unit. It is further advantageous to use a throttle valve sensor and in some cases an electronically controlled throttle valve actuator that allows the use of a characteristic correlation between the engine-load lever position and the throttle valve position (electronic gas pedal). As a practical example, a 0% depression of the gas pedal may be correlated with a power generation of −10% (energy recovery mode), meaning that the vehicle is in a braking mode when the engine-load lever is in the 0% position. The actual brake would in this case be used only if a stronger braking action is needed. As a consequence, the control could possibly be reduced in complexity, because the modalities of cooperating with a brake control system could be omitted or simplified.

The transmission is configured, e.g., as a gear-shifting transmission in which the ratio levels are changed by means of a shift lever, or the transmission is actuated or operated by means of the shift lever. Further more, a sensor 19b is arranged at the operating lever or shift lever 18 of the manually shiftable transmission. The sensor 19b serves to detect the current gear position and/or an intent of the driver to shift gears and transmits this information to the control unit. The sensor 19a is connected to the transmission and, likewise, performs the functions of detecting a current gear position and/or an intent of the driver to shift gears. The detection of an intent to shift gears by means of at least one of the sensors 19a, 19b can be achieved by designing the sensor as a force sensor to detect when a force is applied to the shift lever. The sensor could also be configured as a displacement sensor or position sensor, where the control unit would be programmed to determine the presence of an intent to shift if a change has been found in the position signal.

The control unit is in signal communication with all of the sensors at least at certain times and evaluates the sensor signals and system input quantities in such a manner that the control unit sends control or regulation commands to the at least one actuator dependent on the current operating point of the system. The drive source 12 of the actuator, such as an electric motor, receives from the clutch-actuator control unit an actuating quantity that depends on measurement values and/or system input quantities and/or signals of the associated sensors. The control unit contains a control program implemented in hardware or software to evaluate the incoming signals and to calculate or determine the output quantities based on comparisons and/or functions and/or fields of characteristic curves.

It is advantageous if modules are implemented in the control unit 13 to acquire data on torque, shift position, slippage and or operational status, respectively, of if the control unit 13 is in signal communication with at least one of the aforementioned modules. The modules can be implemented as control programs in hardware and/or software to determine on the basis of the incoming sensor signals how much torque is produced by the drive source 2 of the vehicle 1, what gear position the transmission is in, how much slippage is occurring in the torque-transmitting system, and what is the current operating state of the vehicle. From the signals of sensors 19*a* and 19*b*, the gear-position detector unit determines which gear is currently active in the transmission. The sensors 19*a* and 19*b* are operatively connected to the shift lever and/or the internal gear-shifting means inside the transmission, such as for example a central shifting shaft or shifting rod, where the sensors serve to detect for example the position and/or movement of the respective transmission element. Further, a load-lever sensor 31 can be attached to the load lever 30 (such as a gas pedal) to detect the load-lever position. A further sensor 32 can function as an on/off switch that is on or off depending on whether the gas pedal is active or inactive, so that the binary on/off signal indicates whether the engine-load control lever, such as a gas pedal or accelerator pedal, is currently being applied. The load-lever sensor 31, on the other hand, provides a quantitative determination of the degree of load-lever application or gas pedal application.

In addition to the accelerator or gas pedal 30 (or engine-load control lever) with the associated sensors, FIG. 1 shows a brake-actuating element 40 for the main brake or the parking brake, such as a brake pedal, hand-brake lever, or a hand- or foot-operated parking brake actuator. At least one sensor 41 is arranged at the actuator element 40 to monitor its operating state. The sensor 41 may for example be a binary detector such as a switch that indicates whether or not the actuator element is on or off. A signal device such as a brake light can be connected to the sensor to provide an indication that the brake is being applied. This arrangement could be used for the main brake as well as for the parking brake. However, the sensor can also be configured as an analog sensor such as a potentiometer, to indicate the degree of application of the actuator element. The analog sensor, likewise, can be connected to a signal device.

Figure 2:
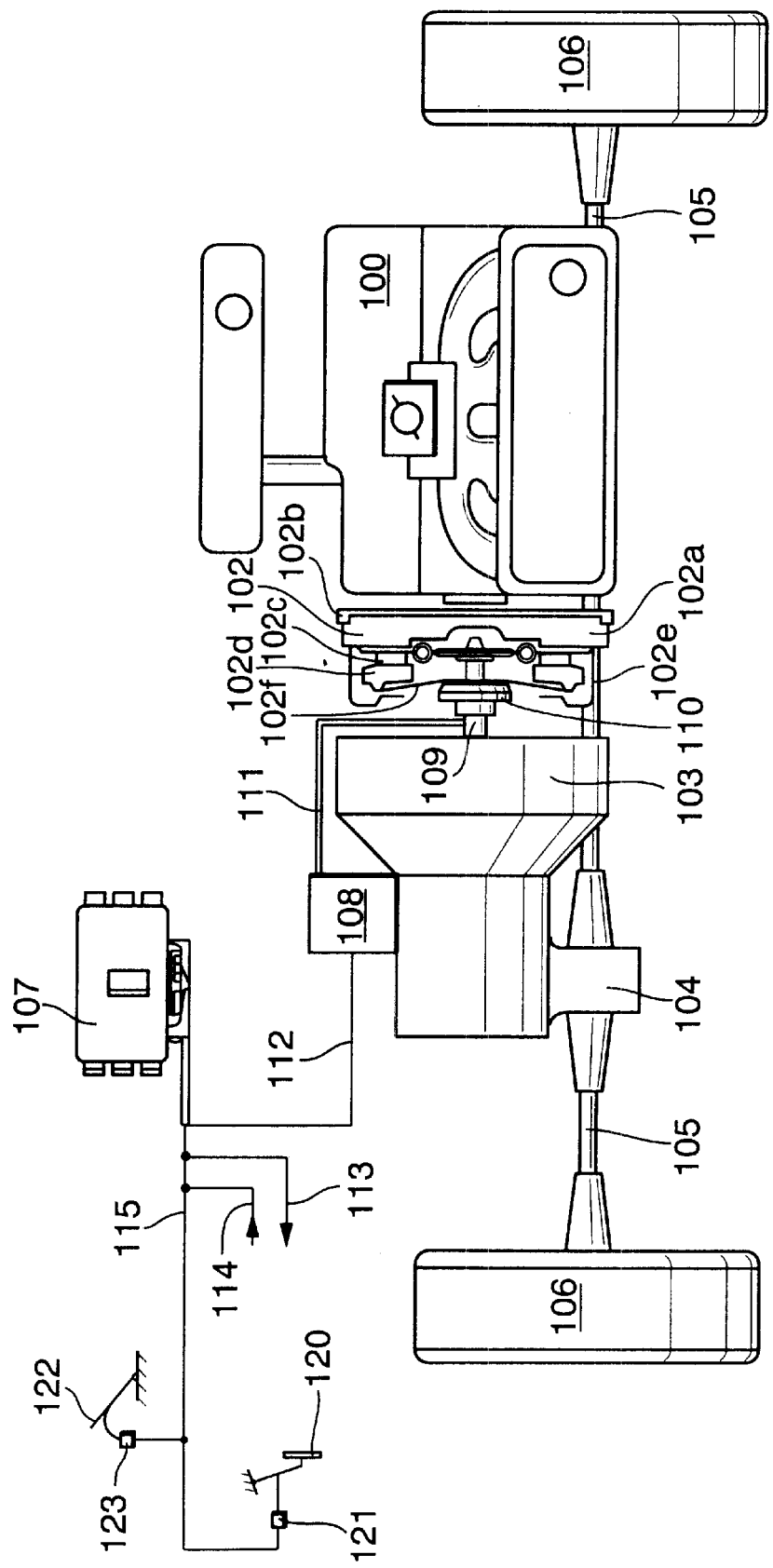
FIG. 2 exemplifies a second embodiment of the invention in a schematic form of representation.

FIG. 2 gives a schematic illustration of a power train of a vehicle with a drive source 100, a torque-transmitting system 102, an arrangement 103 containing at least one transmission, a differential 104 as well as drive axles 109 and wheels 106. As indicated schematically, the wheel-spin protecting device (not shown) cooperates with components of the vehicle. The wheel-spin protecting device can alternatively or additionally represent a wheel-lock up detector. The torque transmitting system 102 is arranged on or attached to a flywheel 102*a* which, as a rule, is equipped with a starter gear rim 102*b*. The torque-transmitting system has a pressure plate 102*d*, a clutch cover 102*e*, a diaphragm spring 102*f*, and a clutch disc 102*c* with friction linings. A clutch disc 102*c*, in some cases with a damper device, is interposed between the clutch disc 102*d* and the flywheel 102*a*. An energy-storing device such as a diaphragm spring 102*f* pushes the pressure plate axially against the clutch disc. A clutch actuator element 109 such as, e.g., a pressure-medium operated central release device, serves to actuate the torque-transmitting system. A release bearing 110 is arranged between the central release device and the tongues of the diaphragm spring 102*f*. When the release bearing moves in the axial direction, it pushes against the diaphragm spring 102*f* and thereby disengages the clutch. The clutch can be configured either as a push-actuated or pull-actuated clutch.

The arrangement 103 with a transmission is represented schematically as a black box. According to the invention, the box contains in particular arrangements with a transmission device to shift between different gears or transmission ratios as well as at least one superimposed secondary drive source and, with particular preference, a planetary gear device. Examples of embodiments are illustrated in FIGS. 3 to 11 which show specifically the portion of the power train that lies between the start-up clutch and the inertial mass represented by the vehicle.

The actuator 108 is an actuator of an automated gear-shifting transmission and also contains an actuator unit for the torque-transmitting system. The actuator 108 serves to actuate shifter elements internal to the transmission such as, e.g., a shifter cylinder or shifter rods or a central shifter shaft of the transmission. The actuator may allow the gears to be engaged and disengaged in sequential order of gear ratio, or also in an arbitrary order. The clutch actuator element 109 is actuated by way of the connection 111. The control unit 107 is connected to the actuator by way of the signal connection 112. The signal connections 113 to 115 summarily represent connections leading to the control unit 107, where the line 114 conducts incoming signals, the line 113 conducts outgoing control signals, and the line 115 represents, e.g., a data bus connection to other electronic units.

To start the vehicle from a stand-still condition or a slow rolling condition or crawl state, i.e., to initiate an acceleration of the vehicle under the control of the driver, the latter in essence only depresses the gas pedal, such as the load control lever 30, as the automated clutch control or regulation takes charge over setting the amount of torque that is transmitted through the torque-transmitting system in a start-up phase. The desires of the driver for more or less acceleration are detected by the engine-load lever sensor 31 based on the position of the accelerator pedal and are subsequently put into effect by the control unit. The gas pedal position and the sensor signals are used as input quantities for controlling the start-up process of the vehicle.

During a start-up phase, the amount of torque to be transmitted, i.e., the target amount for the clutch torque is essentially determined by means of a preset function or from characteristic curves or curve fields for example dependent on the engine rpm rate.

In a start-up phase, substantially from stand-still or from a crawl state, if the load lever or gas pedal is depressed by a certain amount while the vehicle is moving at a low speed, the motor control unit 40 will direct the engine to produce a certain amount of torque. The control unit of the automated clutch actuator 13 in a corresponding manner controls the amount of torque to be transmitted by the clutch in accordance with preset functions or data arrays, so that a stationary state of equilibrium sets in between the engine torque and the clutch torque. Dependent on the load lever position, the state of equilibrium is characterized by a defined start-up rpm rate, a start-up engine torque as well as a defined amount of torque-transmitting capacity of the torque-transmitting system and a defined amount of torque transmitted to the driving wheels. The representation of the start-up torque as a function of the start-up rpm rate will be referred to as start-up characteristic in the following discussion. The load lever displacement is of a proportionate amount as the displacement of the throttle valve of the engine.

In addition to the gas pedal 122 or other engine load controlling lever with an associated sensor 123, FIG. 2 shows a brake-actuating element 120 for actuating the main brake or the parking brake, such as a brake pedal, a hand-brake lever or a hand- or foot-actuated operator element of the parking brake. At least one sensor 121 is arranged at the actuator element 120 to monitor the degree of actuation of the latter. The sensor 121 is configured, e.g., as a binary sensor such as a switch, detecting whether the actuator element is on or off. This sensor can be in signal communication with an indicator device such as a brake light, which signals whether or not the brake is being applied. This concept may be used for the main brake as well as the parking brake. However, the sensor can also be configured as an analog sensor, e.g., in the form of a potentiometer, to determine the degree of activation of the actuator element. This sensor, too, can be in signal communication with an indicator device.

Figure 3:
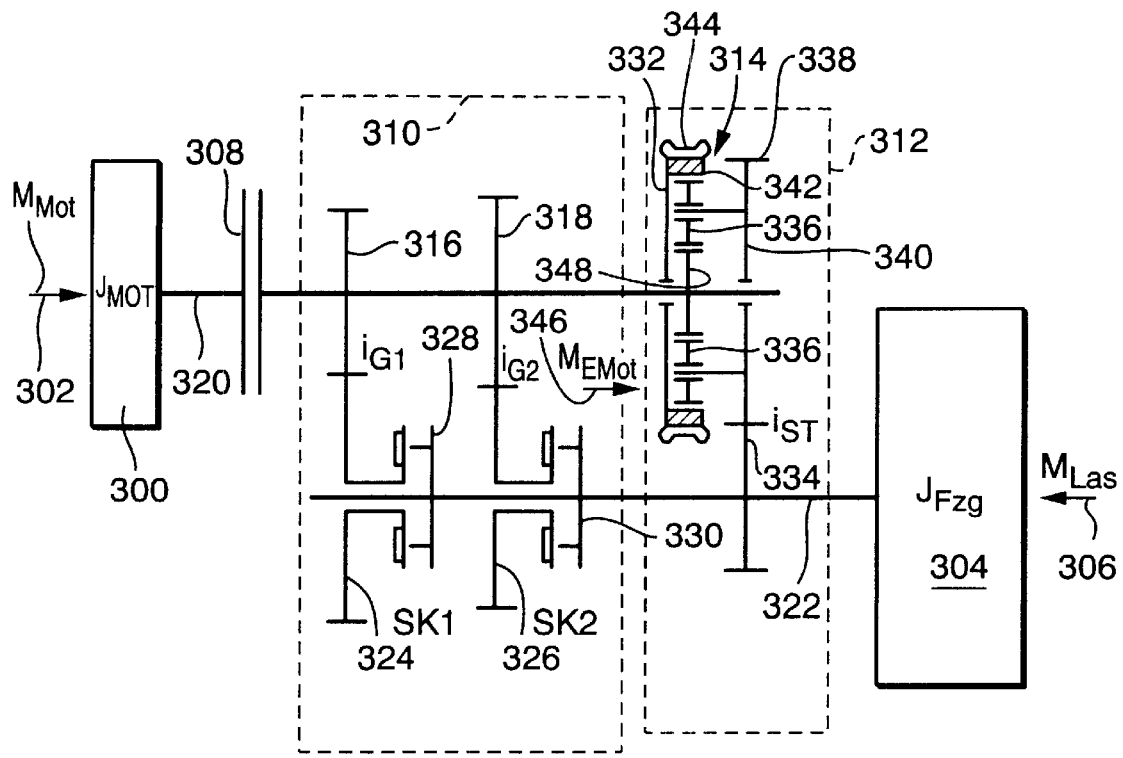
FIG. 3 exemplifies a third embodiment of the invention in a schematic form of representation.

FIG. 3 illustrates a third example of an embodiment of the invention in a schematic view.

Between the engine torque 302 (shown schematically as acting on a mass moment of inertia 300 of the engine) and the load-moving torque 306 (shown as acting of a mass moment of inertia 304 of the vehicle), there is an arrangement that includes a torque-transmitting system in the form of a start-up clutch 308, a (primary) transmission stage 310 as well as a superimposed additional transmission device 312 containing at least one secondary transmission stage in the form of a planetary gear device 314. The first transmission stage 310, through which the different gears are shifted, is shown here as a transmission with two gear levels and a neutral position.

The illustrated example of a two-speed transmission with a neutral position is in no way meant to limit the invention to two-speed transmissions. It should be expressly noted that the scope of preferred transmissions according to the invention per se also covers transmission devices that are not configured as step-shifting or gear shifting transmissions.

In the transmission device 310, a first fixed gear 316 and a second fixed gear 318 are mounted on and rotationally locked to the transmission input shaft 320. The first fixed gear 316 as well as the second fixed gear 318 are engaged, respectively, in a first free gear 324 and a second free gear 326, that are mounted rotatably on the transmission output shaft 322. By means of the clutch devices 328 and 330, preferably configured as a single clutch device, a rotationally locked condition can be established between the gear 324 and the transmission output shaft 322, or between the gear 326 and the transmission output shaft 322. Upstream of the first transmission device 310, i.e., on the side of the engine, the start-up clutch 308 is arranged on the transmission input shaft 320. The superimposed additional transmission device 312 is arranged on the opposite side of the first transmission device, i.e., facing away from the engine. The superimposed transmission device includes a planetary gear set 314 with a ring gear 332 that is mounted rotatably in relation to the transmission input shaft 320. Rotatable likewise in relation to the transmission input shaft 320 is a planet carrier 340 with planet gears 336. The planet carrier 340 has a tooth profile 338 or has a preferably rotation-locked attachment to a component with a tooth profile 338. The tooth profile 338 engages a tooth profile of a gear 334 mounted in a rotationally locked condition on the transmission output shaft. The sun gear 348 of the planetary gear set is mounted on and rotationally locked to the transmission input shaft. An electro-magnetic rotor 342 is mounted on the ring gear 332 of the planetary gear set through a rotationally fixed connection or is included as an integral portion of the ring gear 332. The rotor 342 interacts at least part of the time with a stator 344. At any time when the vehicle is in operation, a superimposed torque 346 can be introduced into the power train by way of the electro-mechanical energy converter 342, 344. At times when the vehicle is powered by the combustion engine, i.e., when the combustion engine is delivering power to the drive train or receiving power from the drive train, the start-up clutch is engaged and a gear of the shift transmission is transmitting torque through the transmission. Thus, the rpm rates of two shafts of the superimposed transmission device are dictated by outside constraints. In this situation, the superimposed transmission device is not introducing any change in the ratio of rpm rates.

Figure 4:
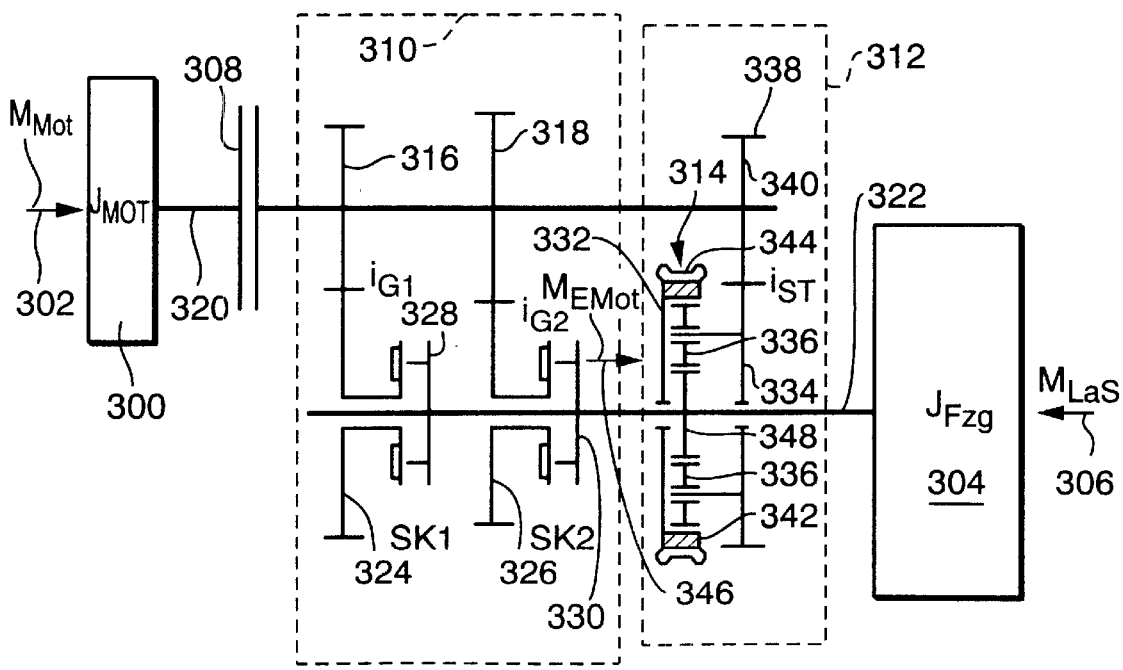
FIG. 4 exemplifies a fourth embodiment of the invention in a schematic form of representation.

FIG. 4 illustrates a fourth example of an embodiment of the invention in a schematic representation. This embodiment is distinguished from the embodiment of FIG. 3 in particular by the fact that the planetary gear device 314, specifically the sun gear 348 of the planetary gear device 314, is arranged on the transmission output shaft 322.

Figure 5:
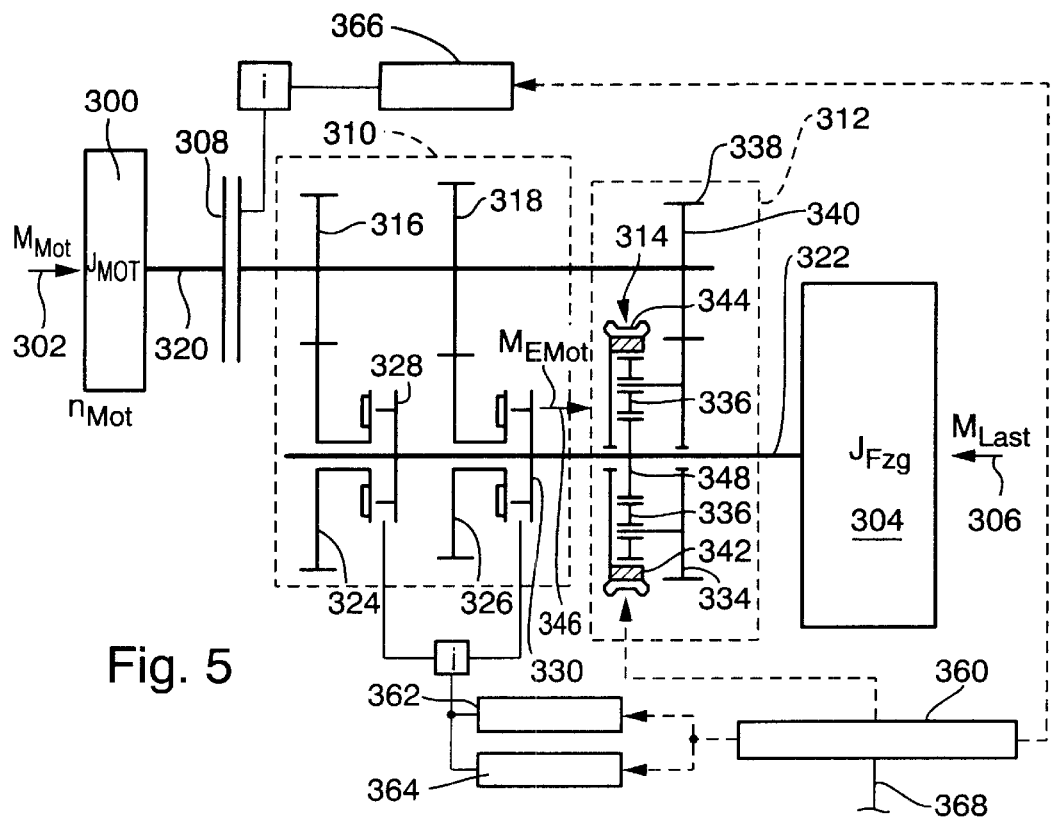
FIG. 5 exemplifies a fifth embodiment of the invention in a schematic form of representation.

FIG. 5 shows a fifth example of an embodiment of the invention in a schematic representation.

The embodiments of FIG. 4 and FIG. 5 have in common that the sun gear 348 of the planetary gear device 314 is arranged on the transmission output shaft 322. In this regard, it should be noted that arrangements where the planetary gear device 314 and specifically the sun gear 348 is arranged on the transmission input shaft 320 are included among the preferred embodiments of the invention. This applies in particular to the representations according to FIGS. 6 to 13.

As can be seen from the schematic view of FIG. 5, the start-up clutch 308 of the transmission device 316, 318, 324, 326, 328, 330 as well as the electro-mechanical energy converter 344, 342 and the associated second transmission device with the planetary gear device 314 are preferably operated by automated actuation. In this arrangement, the control unit 360 performs in particular the control of the transmission device 316, 318, 324, 326, 328, 330, of the electro-mechanical energy converter 344, 342, more specifically of its stator 344, as well as of the start-up clutch 308. To control the transmission device 316, 318, 324, 326, 328, 330, the control device 316 performs the functions labeled "shift 362" as well as "select 364". The function "engage 366" of the start-up clutch 308 is likewise performed by the control device 360. The electro-mechanical energy converter 344, 342 is controlled in particular by way of the current supplied to the stator 344. As indicated schematically by the line 368, the transmission-control device 360 is connected to other control devices of the vehicle, which are not represented in the drawing.

For example, there is a communication with a controller area network (CAN). The symbolic indication 368 of lines of communication includes, e.g., the communication with a control device for the combustion engine or a brake control system (e.g., an electrical brake). Further, the invention also addresses the possibility that the control unit 360, by way of either a wired or wireless communication line 368, may cooperate with an energy-recovery device (not shown) that recovers kinetic energy from the motion of the vehicle. For example, the invention proposes a concept where a mode of operation and a gear level are set by a higher-ranking power-train control of the vehicle. The communication device 368 further allows a uniform mode of control or signal transmission and signal processing between the control unit 360 and a power steering unit driven by an electric motor and/or an electrically powered coolant pump, or other electrically driven devices and/or their respective controls.

Figure 6:
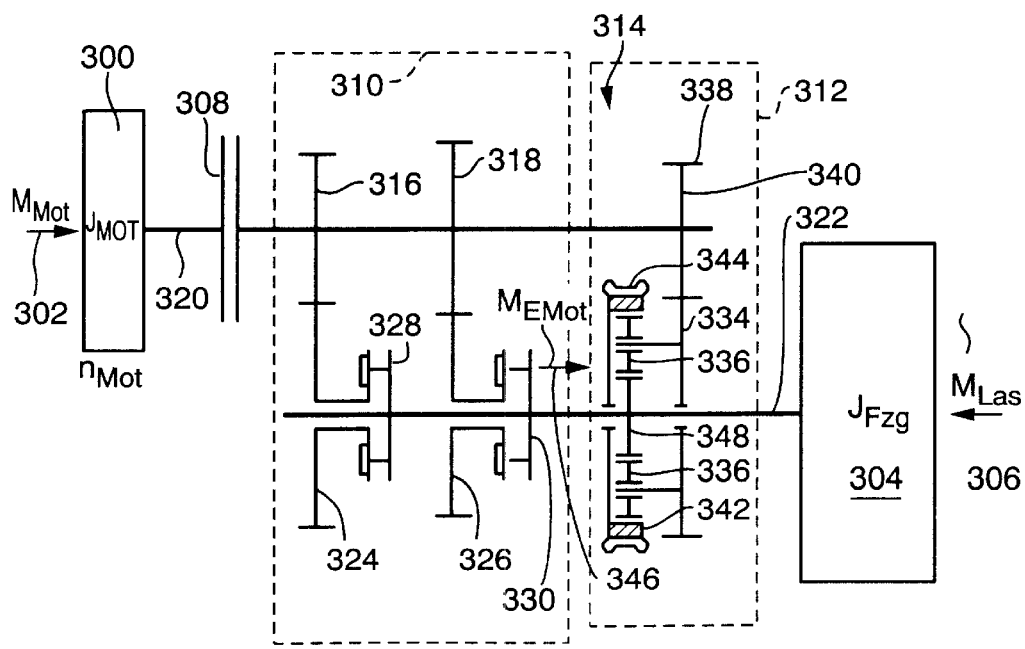
FIG. 6 exemplifies a sixth embodiment of the invention in a schematic form of representation.

FIG. 6 schematically illustrates a sixth embodiment as a further example of the invention.

As shown in FIG. 6, the clutch device 328 in this case is in an engaged condition, so that the rpm rate of the transmission output shaft 322 is clearly defined based on a given rpm rate of the transmission input shaft 320 and the ratio of the currently engaged gear stage 316, 324. The input and output rpm rates represent the border-interface quantities of the superimposed transmission device. The electro-mechanical energy converter 342, 344 allows additional power to be injected.

Figure 7:
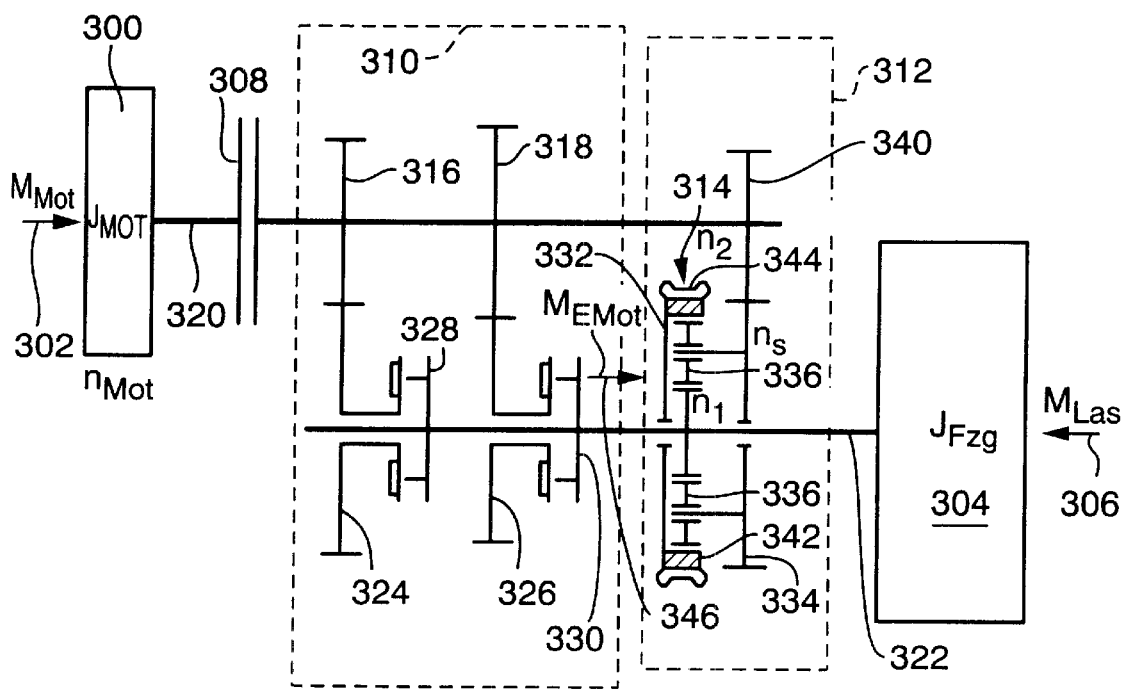
FIG. 7 exemplifies a seventh embodiment of the invention in a schematic form of representation.

FIG. 7 schematically illustrates a seventh embodiment as a further example of the invention.

In FIG. 7, the shift clutches 328, 330 of the transmission device 316, 318, 324, 326 are shown in a disengaged condition, so that no rotary movement is transmitted from the transmission input shaft 320 to the transmission output shaft 322 through the gear stage 316, 324, nor through the gear stage 318, 326. The rotation that the combustion engine imparts on the transmission input shaft 320 is transmitted, with an rpm ratio transformation, through the superimposed additional transmission device 340, 334, 336, 342, 344 to the transmission output shaft 322. The transmission ratio is in this case set by means of the electro-mechanical energy converter 344, 342.

This allows, e.g., a start-up procedure in which the transmission ratio between the input and output of the transmission is controlled by the rpm rate of the electric motor, so that the vehicle can be set in motion with the start-up clutch engaged.

Figure 8:
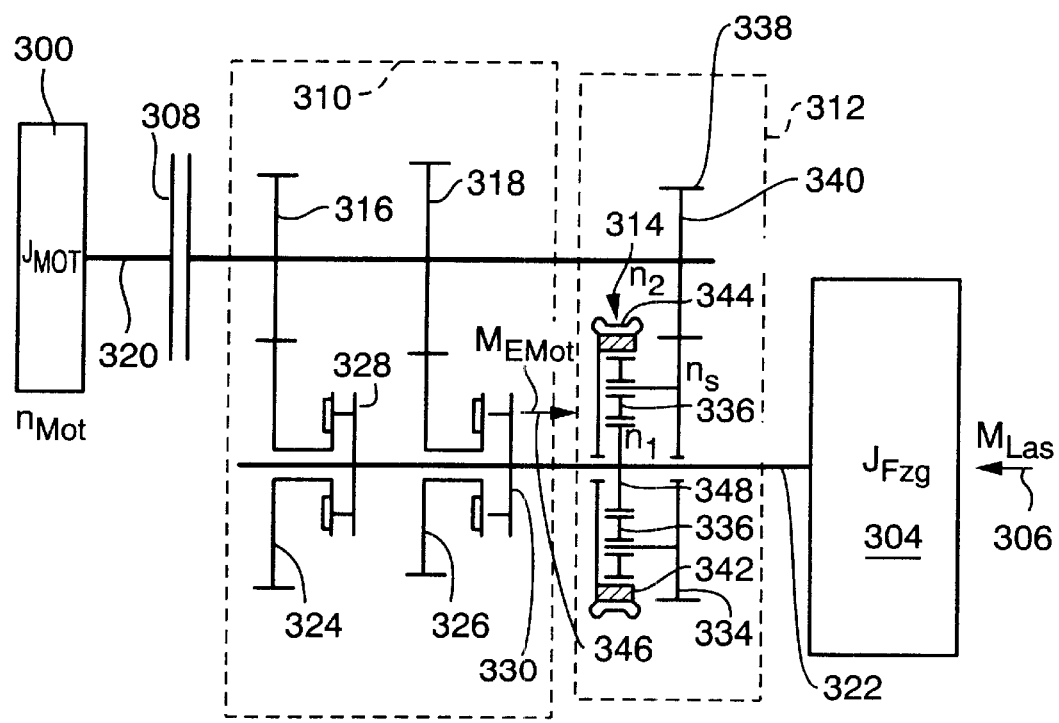
FIG. 8 exemplifies an eighth embodiment of the invention in a schematic form of representation.

FIG. 8 schematically illustrates an eighth embodiment as a further example of the invention.

The illustrated example shows that with a gear stage of the shift transmission engaged, i.e., with the gear pair 316, 324 transmitting torque through the engaged shift clutch 328, the electro-mechanical energy converter 344, 342 taps off power from the drive train of the vehicle and charges a battery (not shown) while the transmission ratio stays constant. For example, the combustion engine (not shown) could be operated in a braking mode, or it could be idling or turned off, with the start-up clutch disengaged.

Figure 9:
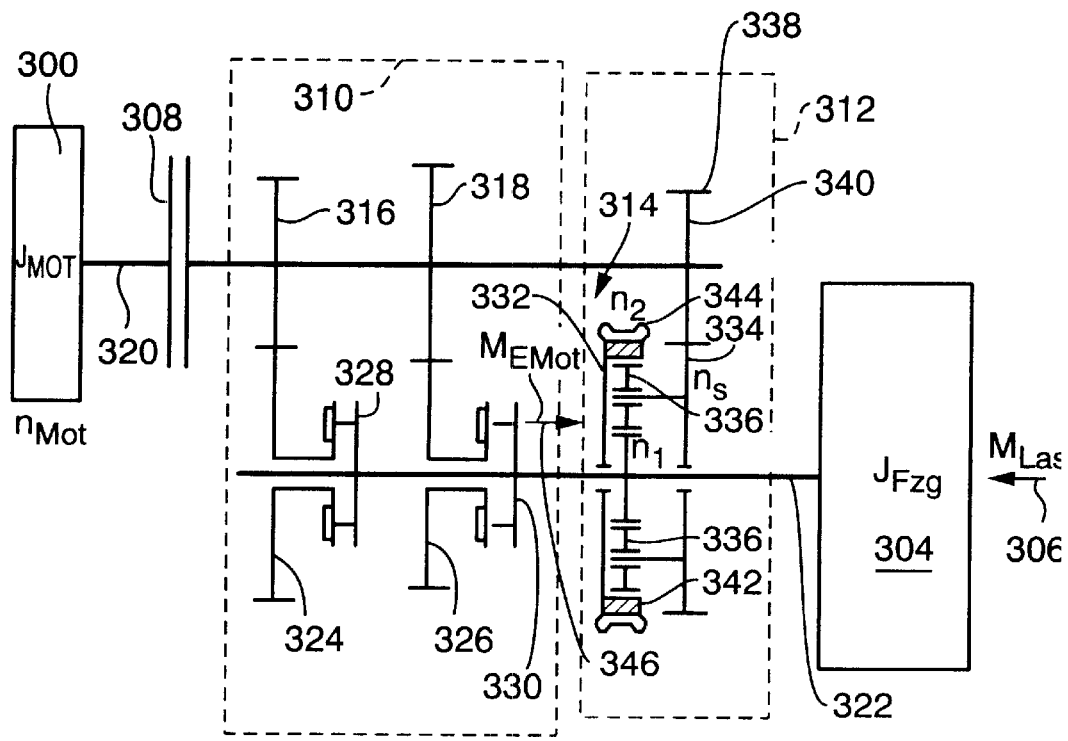
FIG. 9 exemplifies a ninth embodiment of the invention in a schematic form of representation.

FIG. 9 schematically illustrates a ninth embodiment as a further example of the invention.

In this example of the invention, the start-up clutch 308 is in a disengaged condition, and the electro-mechanical energy converter 344, 342 supplies power to the drive train while a gear stage of the transmission is engaged. This allows the vehicle to be driven in a mode of operation that is not combustion-powered. This mode of operation can be advantageous, e.g., in stop-and-go traffic or to drive the vehicle in reverse. Thus, according to the invention, the reverse gear could be omitted from the transmission.

Figure 10:
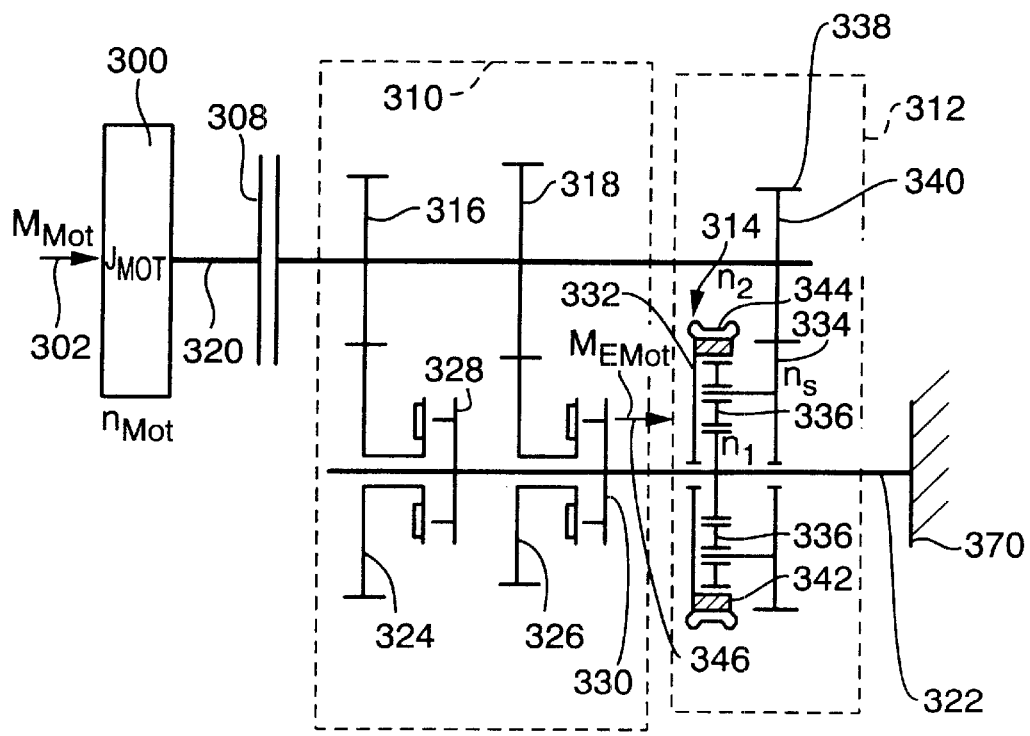
FIG. 10 exemplifies a tenth embodiment of the invention in a schematic form of representation.

FIG. 10 schematically illustrates a tenth embodiment as a further example of the invention.

This example demonstrates schematically how the combustion engine can be started by means of the electro-mechanical energy converter, e.g., if the drive shaft or transmission output shaft 322 is immobilized either by a main brake or a parking brake (symbolized by the fixed constraint 370) and the torque from the energy converter is supplied at the ratio of the superimposed transmission device with the planetary gear set 314 through the engaged start-up clutch 308. This arrangement will, for example, allow a design where the engine can be started only if the main brake is applied, which is often desirable, for example in vehicles with an automated shift transmission.

For example, it is one of the preferred concepts of the invention that after activating the engine start process, a brake control device (not shown) will not release the main brake until the start-up clutch has been disengaged after the engine has been started.

Figure 11:
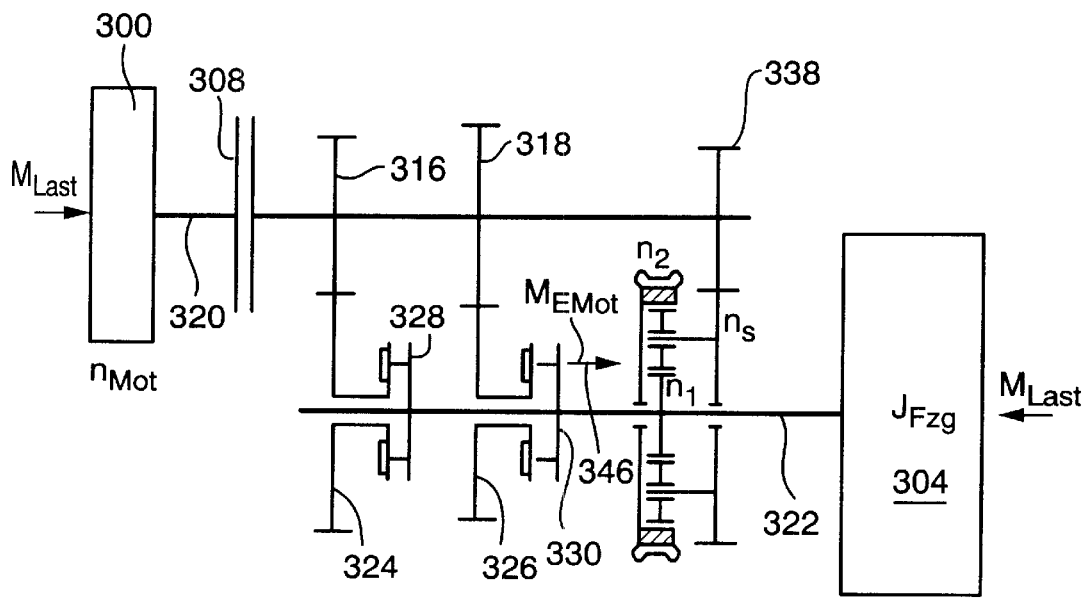
FIG. 11 exemplifies an eleventh embodiment of the invention in a schematic form of representation.

FIG. 11 schematically illustrates an eleventh embodiment as a further example of the invention.

The example of FIG. 11 demonstrates how, according to the invention, the combustion engine can be started while the vehicle is moving. At the outset, the combustion engine has not yet been started, i.e., is in a turned-off state, and the vehicle is, e.g., running under electric power or is coasting in an electricity-generating mode. In other words, the vehicle is moving with the combustion engine is turned off.

In this kind of a situation, the starting of the combustion engine should be initiated by actuating the engine-load lever or, in general, by a signal indicating the driver's desire to accelerate the vehicle.

For example, the invention provides that in cases where the output rpm rate is sufficient to produce an adequate input rpm rate for running the combustion engine with the transmission in gear, the combustion engine is accelerated while the start-up clutch is being engaged. Preferably, the reduction in the tractive force caused by the engine start is compensated by a commensurate actuation of the electro-mechanical energy converter.

In situations where the output rpm rate is insufficient to produce an adequate input rpm rate for running the combustion engine with the transmission in gear, the invention provides further that the vehicle be at first accelerated to a speed where the input rpm rate of the transmission with a gear engaged will be sufficient to use the combustion engine to supply part of the power. If there is a signal indicating in addition a desire to accelerate, the procedure described above is followed.

In situations where the output rpm rate is just adequate to produce a sufficient input rpm rate for starting - but not for running - the combustion engine with the transmission in gear, the invention provides that the engine be started as discussed above. Preferably, the start-up clutch 308 is subsequently disengaged for a short time interval so that, for example, the transmission can be shifted to a different gear.

It is further preferred if, in the immediately preceding example, the electro-mechanical energy converter is used to accelerate the vehicle.

It should be noted that the magnitude of the braking torque generated by starting the combustion engine is influenced by the selection of the gear level that is engaged for the start-up.

It is further preferred, if the braking torque produced in the start-up is controlled by activating the individual cylinders in a time-staggered sequence in engines where the valves are individually controllable.

Figure 12:
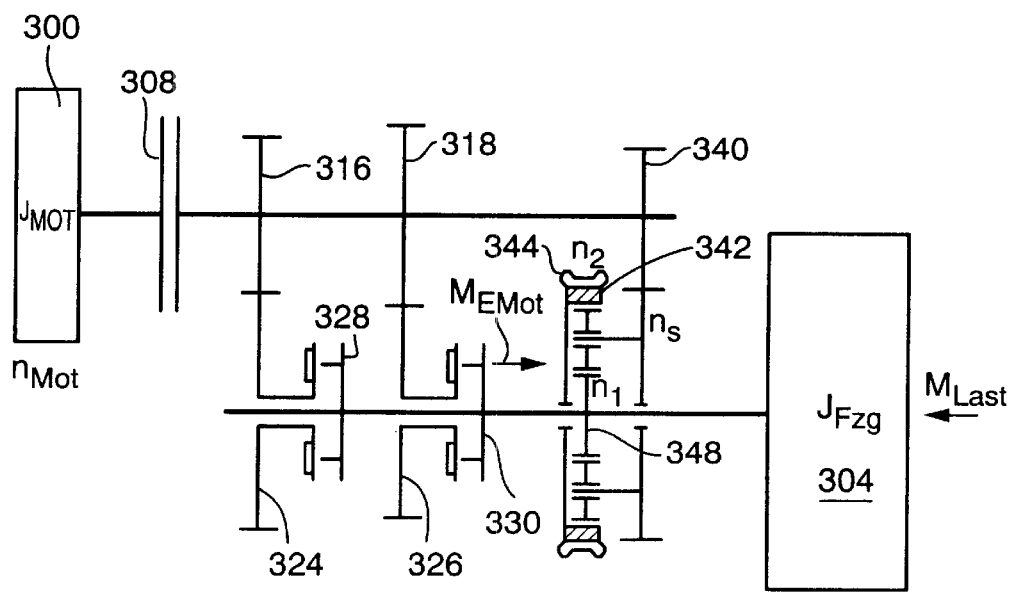
FIG. 12 exemplifies a twelfth embodiment of the invention in a schematic form of representation.

FIG. 12 schematically illustrates a twelfth embodiment as a further example of the invention.

This example demonstrates how the draw-backs associated with an interruption in the tractive force that occurs in conventional step-shifting transmissions can be alleviated or avoided by applying the present invention.

It is further advantageous to use the electro-mechanical energy converter to synchronize the rpm rates of the transmission input shaft and the combustion engine, as the start-up clutch is not taken out of engagement. It is also advantageous to use the electro-mechanical energy converter during a shift phase as a brake for decelerating the combustion engine to the target rpm rate. In this case, the momentum of the rotating masses of the combustion engine and the clutch can be directed to the output shaft, whereby an output torque (tractive force) is generated (power-shift function).

In a down-shift (e.g. through a kick-down function) the electro-mechanical energy converter is accelerated, and the combustion engine under the command of the engine control unit is accelerated to the target rpm rate. During this phase, the torque generated by the combustion engine and braced by the supporting torque of the electro-mechanical energy converter, is directed to the output shaft, whereby a time-gap in the tractive force is avoided.

In a special embodiment, it proves to be of practical benefit that the synchronizing devices of conventional shift transmissions can be omitted due to the synchronization by means of the electro-mechanical energy converter.

As illustrated in FIG. 12, the invention provides in particular that in a beginning phase of a gear change, the shift clutch devices 328, 330 are taken out of engagement, so that the transmission 316, 318, 324, 326, 328, 330 ceases to transmit rotary movement. Substantially at the same time, the electro-mechanical energy converter 344, 342 is directed by the control unit to inject its own torque and rpm rate in order to achieve a ratio between the input and output rpm rates corresponding to the transmission ratio of the targeted gear stage. After the required rpm ratio has been reached by means of the second transmission device with the planetary gear set 314, the shift clutch of the new gear stage is engaged and the vehicle returns to combustion-engine power.

Also as a preferred mode of operation, the start-up clutch 308 is taken out of engagement prior to a gear change, so that the full amount of the tractive torque in the transmission output shaft 322 during the shift process is provided by the electro-mechanical energy converter 342, 344 by way of the planetary gear device 314.

The invention further relates to a transmission, in particular for use in vehicles, such as a gear-shifting transmission with at least two shafts, i.e., an input shaft and an output shaft as well as in some cases a counter shaft or lay shaft, with a plurality of gear pairs, in which free gears are selectively brought into rotation-locked engagement with a first shaft and fixed gears are permanently rotation-locked on a second shaft.

FIGS. 3 to 12 give schematic representations of a motor vehicle transmission that is arranged after a drive source, such as a motor or combustion engine, and a start-up or shift clutch such as, e.g., a friction clutch. The transmission has an input shaft, a counter shaft, and in some cases an additional output shaft. The counter shaft or lay shaft may simultaneously function as the output shaft.

Between the engine and the transmission, there may be a flywheel on which the friction clutch with a pressure plate and clutch cover is arranged. Also, instead of an integral flywheel, the vehicle can have a dual-mass flywheel with two inertial masses that are rotatable in relation to each other against the opposition of position-restoring forces of energy-storing devices that may, e.g., be interposed between the inertial masses.

A damper for rotary oscillations is arranged between the clutch disc and the transmission input shaft. The damper has at least two disc-shaped components that are rotatable relative to each other against the opposing forces of energy-storing devices that may, e.g., be interposed between the disc-shaped components. The clutch disc is preferably provided with friction linings on radially outer surface portions.

The shafts, such as the input shaft, output shaft, and in some cases the counter shaft are rotatably supported and radially centered in bearings inside a transmission housing as well as axially restrained, if necessary.

The input shaft and the output shaft are substantially parallel to each other. In another embodiment, the output shaft may also be arranged coaxially with the input shaft, likewise supported and centered in bearings inside the transmission housing.

The start-up or shift clutch in an advantageous embodiment is designed, e.g., as a wet-running friction clutch inside a transmission housing. In another advantageous embodiment, the clutch may, e.g., be configured as a dry friction clutch inside a clutch bell housing between the engine and the transmission.

The fixed gears of the transmission are mounted on the transmission input shaft in axially and rotationally fixed positions. The fixed gears mesh with the free gears that are freely rotatable on the counter shaft but can be rotation-locked to the latter by means of shift clutches. One gear stage has an additional intermediate gear to reverse the sense of rotation. The latter gear stage thus represents the arrangement for the reverse mode.

The free gears can be selectively brought into rotation-locked engagement with the output shaft by shifting the axial positions of a sliding sleeve. The arrangement allows only one free gear at a time to be engaged to the shaft through a sliding sleeve, because the sliding sleeve effects the engagement by being shifted axially to one or the other of two free gears between which the sliding sleeve is interposed.

The transmission can have two or three assembly groups, each of them constituted by two gear pairs sharing an interposed clutch device such as a sliding sleeve.

The shift clutches are advantageously configured as form-locking couplers such as jaw clutches. Other possible embodiments have friction-locking clutches with conical or plane friction surfaces, including versions with more than one friction surface, as in laminar disc clutches. Further, in another embodiment, the shift clutches can be equipped with a synchronizing device such as a synchronization ring.

Transmissions according to the invention can also be designed as four-speed transmissions with four forward gears and a reverse gear, or as six-speed transmissions with six forward gears and a reverse gear to be mentioned as examples only, without implying any limitations on the general applicability of the invention.

An rpm sensor is arranged to monitor the rpm rate at the output of the transmission, and further sensors may be provided for the input rpm rate of the transmission and the engine rpm rate.

As a further advantageous feature of the invention, a starter motor for the engine can drive a shaft of the transmission. Conversely, the same shaft can drive an electrical generator or alternator. It is particularly advantageous if the starter motor and the generator are combined into one electro-mechanical energy converter such as a starter/generator.

The transmission according to the invention is shifting gears, or is capable of shifting gears, while at the same time transmitting a torque load. The shift under load, also called power-shift, is performed by connecting the electro-mechanical energy converter to the output shaft by means of a clutch.

A vehicle power train according to the invention is equipped with at least one clutch actuator that actuates, e.g., the start-up clutch or clutches for coupling the electro-mechanical energy converter to the drive train.

A particularly advantageous aspect of the invention is that it uses simple building structures in the transmission and works with a low number of actuators.

The advantages of the transmission according to the invention are that it provides a high comfort level due to the interruption-free power-shift, that it allows a compact design with regard to the length of the transmission, that it may possibly allow synchronization devices to be partially omitted, and that it is conducive to transmission designs of light weight and high efficiency.

The power-shift transmission is a counter-shaft transmission with spur gears. A friction clutch between the engine and the input shaft serves as start-up clutch. A spring/damper system is preferably integrated in the clutch disc.

The free gears can be arranged on the input shaft or on the counter-shaft and can be brought into rotation-locked engagement to the shaft through clutches or sliding sleeves. The free gears can be coupled to the shaft through shift clutches; sliding sleeves connect the counter-shaft to the free gears, for example through jaw clutches. The form-locking clutch for first or reverse gear can be combined with a friction clutch such as a synchronizer clutch with a synchronization ring for first and reverse gear. The clutches are actuated by way of at least one actuator.

The system further includes an electronic control unit with a microprocessor for the electronic control of the transmission, an rpm-monitoring arrangement, an electronic throttle-valve control or engine fill control, and an electronic engine control system for the combustion engine, a manually operable gear-selector element such as a lever, switch or the like for manual and/or automated gear selection, and an indicator device in the interior space of the vehicle for indicating the currently operative gear.

An electro-mechanical energy converter which can be used as starter motor, generator, and in some cases as a decelerator or auxiliary drive source, can further be advantageously included.

To initiate the starting procedure, a low gear (first or second) is engaged in the transmission. The start-up clutch is moved into engagement by means of the actuator while the engine is being directed through the gas pedal to build up torque to accelerate the vehicle. The start-up phase is concluded when the start-up clutch is in slip-free engagement. From this point on, the engine torque is transmitted through the engaged clutch and the engaged gear to the drive shaft.

The shift process is in every case initiated by the driver indicating a desire to shift, or by the automatic control.

The clutches can be designed advantageously according to one of the following types:
  wet-running clutch;
  dry-running clutch;
  disc clutch;
  conical clutch with one or more conical friction surfaces;
  clutch with one friction surface;
  clutch with two friction surfaces; or
  clutch with a plurality of friction surfaces (such as, e.g., a laminar disc clutch).

The shift clutches or sliding sleeves to couple the free gears to the shaft can be advantageously configured as
  form-locking clutch, such as a jaw clutch, or
  friction-locking clutch.

In order to optimize the efficiency of the transmission, it is particularly advantageous if the engagement of the clutches or sliding sleeves of the free gears on the shaft is maintained essentially without an expenditure of externally supplied additional energy. This can be achieved by using form-locking clutches. To keep a friction-locking clutch engaged without expending energy, it is advantageous to use energy-storing elements such as, e.g., springs that push the friction surfaces against each other. It is also possible to use wedge-action devices or spring-biased friction clutches.

The tooth profile of form-locking clutches can be configured in various different ways, e.g., with smooth, rounded teeth, with convex claws, Berliet claws, or repelling claws.

It can be advantageous to provide a synchronization with synchronizer rings for first and/or reverse gear. In another embodiment, it can be of practical benefit if at least some of the gears have a synchronization with synchronizer rings.

In transmissions with a countershaft, the free wheels and clutches can be arranged in different ways. The free wheel of each gear can be arranged either on the input shaft or on the countershaft. Thus, the power-shift clutch, too, can be arranged on one shaft or the other in different embodiments.

The transmission can be configured as a four-speed transmission, a five-speed transmission, or also as a six-speed transmission or another kind of multi-speed shiftable transmission.

An advantageous embodiment of the inventive transmission can be arranged advantageously in a transverse layout at the front of the vehicle. Another embodiment can have a lengthwise layout at the front of the vehicle, but the inventive transmission can also be used in other advantageous layouts of the powertrain.

The actuators in different embodiments are advantageously based on electric motors with rotary movement of an output element; electric motors with linear output movement including, e.g., linear motors; rotary hydraulic actuators (such as gear pumps, vane pumps, etc.); linear hydraulic actuators (such as piston/cylinder units, etc.); rotary pneumatic actuators (vane pump, etc.); linear pneumatic actuators (pistons, etc.); piezo-electric actuators; and thermo-mechanical actuators.

An actuator can have force-reduction mechanisms interposed between a motor and an actuating element, e.g., of the following kinds: levers, wedges, cam-disc devices, threaded spindles, worm gears, spur gears, planetary gear sets, etc. Actuators can also work with hydraulic or pneumatic transmitting devices employing master cylinders and slave cylinders, or with pressure-medium based devices in general.

To drive the movement of the actuator-controlled element, one of the following motion-transmitting devices can be used to good advantage. Adjustable or self-adjusting transmitting devices can be employed, e.g., mechanical devices such as levers, pull ropes, rods, slides, wedges, curve-follower devices, etc.; or hydrostatic devices such as master/slave cylinders with or without sniffle bores, hydrodynamic and pneumatic devices.

The functions of several individual actuators for selecting and shifting gears in a gear-changing process can also be combined through the use of transmitting mechanisms. This makes it possible to shift more gear pairs than there are actuators. Examples for this are shift transmissions with an H-shaped shift pattern or a shift-control cylinder which can shift between any number of gear levels with a single actuator. The clutches, including a start-up clutch as well as other clutches, can be of a conventional push- or pull-action design, where in a non-actuated state the clutch engagement is maintained by a spring-bias force of an energy-storing device. A clutch can further be of a force-reducing, self-adjusting type, in which the effect of wear, e.g., on the friction linings is automatically compensated. In a further embodiment, the clutch can be an actuator-engaged clutch whose engagement has to be maintained at least in part by an actuator force.

It is advantageous to include a torsional oscillation damper in the power train, e.g., with a spring damper unit between the engine and the start-up/shift clutch. The damper can be integrated in the clutch disc or in a dual-mass flywheel.

Sensors are arranged to monitor the rpm rates of the engine and the transmission. The output rpm rate of the transmission can also be calculated from the wheel rpm rates. It can further be advantageous, if an rpm sensor is arranged at the transmission input shaft.

A motor vehicle transmission according to the present invention may further include:

- Control unit with microprocessor including signal-processing functions, electronics, control logic, signal amplifiers, data bus systems, etc.
- Indicator systems such as warning light, acoustic warning device, shift-level indicator, etc.
- Operator-control element such as stick-shift lever, switch, etc.
- Programs with selector elements for selecting between automatic shift, manual shift, winter mode, sport mode, individual driving habit adapter, etc.
- Electronic engine control with electronic fuel-injection control, such as the so-called E-gas feature, in the combustion engine (electro-motoric, electronic, or other operating principle).
- Sensor arrangement for the detection of engine rpm rate, wheel rpm rate, vehicle doors not shut, hood not shut, etc.
- Data and control signal communication between the transmission control unit and the engine control unit of the combustion engine.

With a transmission as described above, an electro-mechanical energy converter can be designed as an integral combination of starter motor, generator, alternator, starter/generator, decelerator/auxiliary drive source. It is advantageous if the electro-mechanical energy converter is of a type that performs functions including engine start, generating electricity for the on-board power system of the motor vehicle, and in some cases electrical braking to recover kinetic energy, in which case the surplus electrical energy is put back into the power train. The electro-mechanical energy converter can also be used to assist in synchronizing the transmission and to decelerate the transmission input shaft to zero when the vehicle is standing still. This offers the advantage that synchronizer rings can be omitted in some embodiments of the invention. The electro-mechanical energy converter can also be used advantageously to supply torque to the power train during shift phases in order to smooth out abrupt declines of the drive torque.

The engine can be started, among other possibilities, in one of the following two ways. Either the electro-mechanical energy-converter is used to accelerate the combustion engine directly, or the electro-mechanical energy-converter is first brought up to speed independently and then coupled to the combustion engine, e.g. by engaging a friction clutch, in order to use the momentum of a higher rpm rate to start the engine. The latter kind of starting method can be performed through the start-up clutch after the electro-mechanical energy converter has first accelerated the input shaft of the transmission.

With transmissions according to the invention, it is possible to direct the full power of the electro-mechanical energy converter to the output side of the power train or to the input or output shaft of the transmission. Under different operating conditions of the transmission, it may also be enough to direct only a part of the full power of the electro-mechanical energy converter to the input or output shaft.

The electro-mechanical energy converter can be operatively coupled to the input shaft of the transmission to perform one of the following: starting the combustion engine, generating electrical energy from kinetic energy of the engine or transmission, recovering energy, decelerating the rpm rate at the electro-mechanical energy converter (ratio change between the input and output shaft), setting the vehicle in motion with the electro-mechanical energy converter as drive source for the vehicle, boosting the propulsive power of the vehicle by using the electro-mechanical energy converter in tandem with the combustion engine, and moving the vehicle in reverse.

The electro-mechanical energy converter can be operatively coupled to the output shaft of the transmission to perform one of the following: filling the gap in vehicle traction during a shift phase of the transmission when, e.g., the start-up clutch on the input side is at least partially disengaged, generating electricity from kinetic energy of the engine or the transmission, recovering energy, decelerating the rpm rate at the electro-mechanical energy converter (ratio change between the input and output shaft), setting the vehicle in motion with the electro-mechanical energy converter as drive source for the vehicle, boosting the propulsive power of the vehicle by using the electro-mechanical energy converter in tandem with the combustion engine, and moving the vehicle in reverse.

In advantageous design variations, the electro-mechanical energy converter is arranged to act on:
- a gear set for one of the forward speeds,
- a gear on the input shaft,
- a gear on the output shaft, or
- the gear set for reverse drive.

The shift clutch of the gear set driven by the electro-mechanical energy converter can be advantageously configured as follows:
- form-locking or friction-locking clutch at the gear on the input shaft, or
- form-locking or friction-locking clutch at the gear on the output shaft.

A friction-locking clutch may be arranged with a gear on the input shaft and used as start-up clutch.

The actuators may be configured advantageously as follows: electrically energized, pressure-energized (hydraulic or pneumatic).

One actuator may be advantageously employed to actuate a plurality of shift clutches at the gear set of the electro-mechanical energy converter or all other shift elements (shift cylinder, central shift-control shaft).

A torque-transmitting arrangement between the electro-mechanical energy converter and a transmission gear set is advantageously configured as follows:
- in a direct-driving coaxial arrangement,
- with a constant up/down ratio through an intermediate gear,
- with a constant up/down ratio through a gear stage,
- with a continuously variable transmission, or
- with a step-shifting transmission.

The transmission of the following description represents an embodiment of the invention. It is used in the power train of a vehicle with a combustion engine or other drive source. The following operating modes are possible:

1. Vehicle propelled by combustion-engine power at a fixed transmission ratio.
2. Vehicle propelled by combustion-engine power at a transmission ratio controlled by the electro-mechanical energy converter.
3. Vehicle propelled by the combined power of the combustion engine assisted by the electro-mechanical energy converter.

4. Returning energy to the battery by using the electro-mechanical energy converter as a generator.

5. Recovering energy from braking (decelerating) by using the electro-mechanical energy converter as a generator.

6. Vehicle propelled by the electro-mechanical energy converter (forward/reverse).

7. Starting the combustion engine (while the vehicle is stationary or in motion).

8. Bridging the time gap in tractive power of a shift transmission during gear changes.

9. Damping oscillations in the output side of the power train.

Based on an estimate, the minimum power rating required in an electro-mechanical energy converter in a vehicle is nominally between 2 and 20 kW, preferably around 10 kW, assuming that the electro-mechanical energy converter can handle short-term overload conditions. If the electrically propelled driving mode is to be comparable to the combustion-powered mode and if, e.g., the first transmission level is to be replaced by an electrically controlled transmission level, it is practical to design the electro-mechanical energy converter for a nominal power of about 35 kW.

FIGS. 3 to 12 illustrate the functional organization of the power-shift transmission. A combustion engine drives the input shaft of a power-shift transmission through a start-up clutch. The input and output shafts of the power-shift transmission, which has at least two forward speed levels, are each connected to a shaft of the superimposed additional transmission device, in some cases through additional fixed-ratio gear stages. The superimposed additional transmission device has one shaft connected to the output shaft of the shift transmission, constituting the output of the overall transmission arrangement. The third shaft of the superimposed additional transmission device is connected to an electro-mechanical energy converter (in some cases through an additional fixed-ratio gear stage).

The position-setting members are automatically actuated and controlled by a transmission control unit which in some cases also controls the electro-mechanical energy converter. However, the latter function can also be performed by a separate control unit.

1. Vehicle propelled by combustion-engine power at a fixed transmission ratio: When the vehicle is running under combustion-engine power (where the engine is delivering power to the power train or taking power out of the power train), the start-up clutch is engaged and a gear of the shift transmission is set. Thus, the rpm rates are externally dictated for two of the shafts of the superimposed transmission device. The rpm ratio between the input shaft and the output shaft of the shift transmission is not affected by the superimposed transmission device. Thus, when driving under combustion-engine power, there is no change from a regular shift transmission to a power-shift transmission. Because the rpm ratio of two of the shafts of the superimposed transmission device is externally dictated, the electro-mechanical energy converter by way of the third shaft has a constant rpm ratio to the output shaft.

2. Vehicle propelled by combustion-engine power at a transmission ratio controlled by the electro-mechanical energy converter: When the vehicle is running under combustion-engine power, with the start-up clutch engaged, but all shift clutches out of engagement, the transmission ratio of the superimposed transmission device from the planet carrier to the sun gear (the latter being rigidly constrained to the output shaft) can be regulated through the rpm rate of the electro-mechanical energy converter (where the latter can run at an identical rpm rate as the sun gear or at a proportional rpm rate). Thus, it has been made possible to realize a certain rpm ratio between the input and output of the transmission and to create a substitute for a gear stage with shift clutch. It is conceivable, for example, to use this operating mode to perform the function of the first gear level of the shift transmission and to omit the respective gear stage and shift clutch from the transmission. This operating mode further provides an advantageous way of controlling the process of setting the vehicle in motion by regulating the input/output ratio of the transmission through the rpm rate of the electro-mechanical energy converter, so that one could even take off from stand-still with the start-up clutch engaged.

3. Vehicle propelled by the combined power of the combustion engine assisted by the electro-mechanical energy converter: As already stated above under 1., when one of the gear levels of the shift transmission is engaged, the electro-mechanical energy converter works at a constant ratio in relation to the output shaft of the transmission, which makes it possible for the electro-mechanical energy converter to supply power to the drive train and to thereby assist the combustion engine.

4. Returning energy to the battery by using the electro-mechanical energy converter as a generator: As already stated above under 1., when one of the gear levels of the shift transmission is engaged, the electro-mechanical energy converter works at a constant ratio in relation to the output shaft of the transmission, which makes it possible for the electro-mechanical energy converter to extract power from the drive train and to charge the battery.

5. Recovering energy from braking (decelerating) by using the electro-mechanical energy converter as a generator: As already stated above under 1., when one of the gear levels of the shift transmission is engaged, the electro-mechanical energy converter works at a constant ratio in relation to the output shaft of the transmission, which makes it possible for the electro-mechanical energy converter to extract power from the drive train and to charge the battery. In this mode, the combustion engine can be used as a brake, or it can run idle with the start-up clutch disengaged, or it can be turned off.

6. Vehicle propelled by the electro-mechanical energy converter (forward/reverse): As already stated above under 1., when one of the gear levels of the shift transmission is engaged, the electro-mechanical energy converter works at a constant ratio in relation to the output shaft of the transmission, which makes it possible for the electro-mechanical energy converter to supply power to the drive train and to propel the vehicle while the start-up clutch is disengaged and the combustion engine is not being used. This mode of operation can be appropriate in stop-and-go traffic. It also offers the possibility to omit the reverse gear set from the shift transmission and replace it by a purely electrical drive source. The purely electrical drive mode also allows gear changes by moving the shift clutches from one gear to another to adjust the electric motor torque to the rpm rates. The vehicle can also be driven under electric power by stopping the combustion engine and letting the input-connected branch of the superimposed transmission device brace itself against the compression torque of the engine. In engines with freely controllable valves, the compression torque can be increased by closing all of the valves.

7. Starting the combustion engine 7.1 Starting the combustion engine while the vehicle is stationary: When the shift transmission is in neutral and the transmission output is immobilized by applying the main brake, the output-connected shaft of the superimposed transmission device is held fixed so that it cannot turn in relation to the transmission housing. Therefore, the rpm ratio between the two other shafts of the superimposed transmission device is fixed as dictated by the respective numbers of teeth. With the start-up clutch engaged, the electro-mechanical energy converter can be used to start the combustion engine. This imposes the condition that the starter can only be activated if the main brake pedal is depressed. It is advantageous if, after the starter has been activated, a brake control unit keeps the main brake from being released until the start-up clutch is taken out of engagement after the combustion engine has been started.

7.2 Starting the combustion engine while the vehicle is moving: This situation occurs when the vehicle is either in the electrically propelled mode or is coasting in a generator mode, while the combustion engine has not yet been started or is turned off. In this case, the vehicle is moving while the combustion engine is not running. If the driver has indicated a desire to accelerate (as detected from the position of the load-control lever or gas pedal), the combustion engine needs to be started up without any uncomfortable consequences in the driving behavior of the vehicle. One needs to distinguish between three different operating states:

a) The output rpm rate is sufficient, so that the input rpm rate with the transmission in gear will be high enough to allow the combustion engine to provide running power to the vehicle.

b) The output rpm rate is insufficient, so that the input rpm rate with the transmission in gear would be too low to allow the combustion engine to provide running power to the vehicle.

c) The output rpm rate is just adequate, so that the input rpm rate with the transmission in gear will be high enough to start the combustion engine, but too low to allow the combustion engine to provide running power to the vehicle.

In case a), the start-up clutch is brought into engagement with the transmission in gear, and the combustion engine is accelerated by the momentum of the moving vehicle mass. The torque used for starting the engine, which would otherwise be experienced as a braking torque, is replaced by the electro-mechanical energy converter, so that the driving comfort is not affected.

In case b), the vehicle is first brought up to a sufficient speed by electric drive power, so that the transmission input rpm rate is adequate to enable the combustion engine to provide running power to the vehicle, unless the desire to accelerate has been revoked (as detected from the position of the load-control lever or gas pedal). If a continued desire for acceleration is detected, the procedure from this point on is the same as described above under a).

In case c), one has to distinguish between two possibilities:

c1) The first possibility is to start the combustion engine as described above under a). Because the input rpm rate of the transmission is below the operative rpm range of the engine, the start-up clutch is taken out of engagement again. Possibly, another gear is engaged, whereupon the vehicle is accelerated by using the combustion engine alone.

C2) The second possibility is to use the same procedure as described above under b).

The decelerating effect that the braking torque of the engine has on the vehicle during the engine start-up can be reduced by engaging a higher gear. It is further conceivable to reduce the braking torque in an engine that is equipped with freely controllable valves by starting the individual cylinders in a time-staggered sequence.

7.3 Operating strategy for start-stop mode: Based on the procedures described above for starting a combustion engine in different operating situations, it is possible to design an operating strategy for a start-stop mode of driving.

8. Bridging the time gap in tractive power of a shift transmission during gear changes: When driving with the combustion engine as drive source (with the engine supplying power to the drive train), the tractive force is interrupted during gear changes of the shift transmission, because the shift clutches have to be taken out of engagement. The gap in the tractive force affects the driving comfort, especially when up-shifting under traction. The combustion engine has to be brought to a different rpm level (in the case of an up-shift, to a lower rpm level), so that the new gear can be engaged smoothly.

As a first possibility of bridging the time gap in the tractive force, the transmission is shifted into neutral while the start-up clutch is kept engaged. The rpm rate of the output-connected shaft of the superimposed transmission device is dictated by the speed at which the vehicle is moving. The objective is to direct the kinetic energy of the combustion engine into the drive train by way of the electro-mechanical energy converter until the engine has reached the target rpm rate for the new gear. This is accomplished by regulating the rpm rate and the inflow or outflow of power in the shaft that connects the superimposed transmission device to the electro-mechanical energy converter in such a manner that the power flows either from the input-connected shaft of the superimposed transmission to the output or in the opposite direction, as needed to either use up or increase the kinetic energy of the engine until the target rpm rate has been attained. At this point, the new gear is brought into engagement and the normal, combustion-powered operating mode is resumed.

As a second possibility of bridging the time gap in the tractive force, the start-up clutch is taken out of engagement while the shift clutch of the currently operative gear is kept engaged and the tractive power is supplied by the electro-mechanical energy converter. When the rpm rate of the combustion engine has fallen to the target rpm rate for the new gear, e.g., due to friction, the shift clutch of the currently operative gear is taken out of engagement, and the shift clutch of the new gear is brought into engagement.

9. Damping oscillations in the output side of the power train. Shifting gears or engaging a clutch can give rise to oscillations in the down-stream part of the drive train (relative to the shift transmission) which manifest themselves in a rocking motion of the vehicle.

In those operating situations where a shift clutch is engaged, the electro-mechanical energy converter is tied to the output shaft at a fixed rpm ratio. If the electro-mechanical energy converter is equipped to monitor its own rotor movement or if the transmission system includes sensors that detect irregularities in the rotation of the output shaft, the electro-mechanical energy converter can be used to generate a controlled torque to counteract the oscillations.

Control of the Transmission:

According to the inventive concept for the power train, the actuation of the start-up clutch and the shift transmission are automated. A control unit coordinates the functions and also regulates the electro-mechanical energy converter. The control unit communicates with other control devices of the vehicle, e.g., by way of a CAN bus.

Superordinate Controls, Combinations with other Automated Systems:

The transmission control unit can be combined with other controls, e.g., with the control of the combustion engine and the regulating system for the brakes (e.g. in the case of an electrical brake), and with the control for the recovery of kinetic energy. The commands for which operating mode is to be used and which gear is to be engaged may be dictated by a master control unit of the entire drive train.

Eliminating the Belt-Drive Stage:

If the vehicle is equipped with an electrically driven power-steering system, an electrically driven coolant pump and if applicable, further electrically powered devices, the belt-drive stage can be completely eliminated, whereby friction is reduced in the combustion engine.

Electro-Mechanical Energy Converter:

The electro-mechanical energy converter has to be operable both as a motor and as a generator. To the extent possible and within the given capacity limit, the torque needs to be controllable independently of the rpm rate of the rotor through a voltage control, so that through an appropriate actuating means, the electro-mechanical energy converter can be set to run at the desired point of its operating characteristic (exciter field attenuation). It is also advantageous if the electro-mechanical energy converter has the capability to withstand short-term overload situations, because the operating modes as an engine starter and as a substitute drive source during traction gaps require a high power output only during short time intervals.

If the reverse gear of the shift transmission is to be replaced by a purely electrical reverse-drive mode, the electro-mechanical energy converter needs to be designed so that is can run in either sense of rotation, and the electronic power control must be capable of directing the flow of electric power accordingly.

Suitable types of power plants are externally excited machines such as reluctance motors, asynchronous motors, EC motors, DC shunt motors and, possibly, synchronous motors and stepper motors. The control capability of the machine should include its use as an energy-recovering brake.

Intermediate Storage of Electrical Energy:

The electrical energy produced by using the electro-mechanical energy converter as a generator is fed into a suitable storage device. The storage device can be a battery or a fuel cell.

Coarse Estimate of the Required Power-Capacity of the Electro-Mechanical Energy Converter:

The required power-capacity of the electro-mechanical energy converter depends on the operating characteristics, the transmission ratio between the energy converter and the output shaft as well as the operating rpm rate. The transmission ratios between the energy converter and the output shaft as well as the operating rpm rates are different for the individual operating modes. When the vehicle is operated in the electrically powered mode, the output torque of the energy converter is directed to the output shaft. When, on the other hand, the electro-mechanical energy converter is used as a starter motor, its output torque is directed to the combustion engine.

Approximate values for the power requirements are presented in the following Table 1, which is based on a compact car and includes certain assumptions about the transmission ratios. Since the dynamic behavior was not taken into account, the table values will have to be increased by an allowance for the acceleration of the moving system masses themselves.

TABLE 1

Power requirements in different operating modes

| Operating Mode | 1, 3, 4, 5 | 6 | 7 | 8 |
|---|---|---|---|---|
| Description | | Electrically powered drive mode | Engine start-up (vehicle moving) | Bridging time gaps of the tractive force |
| Nominal power requirement (est.) with 300% short-term overload capacity | 10 KW | 15 kW dependent on specified requirements for generator mode and boost mode | 10 kW dependent on requirements for vehicle performance | 15 kW (15 kW) |

Fundamental Equations of the Transmission Arrangement:

Relationship between the rpm rates of the superimposed transmission device:

$$n_1 - n_2 - n_s(1 - i_{12}) = 0 \quad (1)$$

wherein $n_1$, $n_2$, $n_s$ are the rpm rates of the sun gear, ring gear and planet carrier, respectively, and $i_{12}$ is the ratio between the respective numbers of teeth of the sun gear and ring gear.

Equilibrium Between the Torques Acting on the Superimposed Transmission Device:

$$M_1 + M_2 + M_s = 0 \quad (2)$$

wherein $M_1$, $M_2$, $M_s$ are the torques acting on the sun gear, ring gear and planet carrier, respectively.

Relationship Between Torques when a Gear is Engaged by a Shift Clutch:

$$M_{input} = -M_{engine} - \frac{M_{SC}}{i_{gear}} \quad (3)$$

$$M_{sc} = M_{load} + M_2 + M_s \quad (4)$$

wherein $M_{input}$, $M_{engine}$, $M_{sc}/i_{gear}$ represent the respective amounts of torque entering into the input shaft from the electro-mechanical energy converter, the combustion engine, and from the output shaft by way of the engaged transmission gear. $M_{sc}$ is the torque passing through the shift clutch and $i_{gear}$ is the gear ratio of the engaged gear pair.

Relationship Between Torques Acting on the Superimposed Transmission Device when the Shift Clutches are Disengaged:

$$M_s = -M_1(1 - i_{12}) \quad (5)$$

$$M_2 = -M_1 i_{12} \quad (6)$$

Power Balance (Disregarding Losses)

$$(M_1 n_1 + M_2 n_2 + M_s n_s) \times \frac{2\pi}{60} = 0 \qquad (7)$$

The fundamental equations can be formulated specifically as applicable for each mode of operation, where in each case certain specific quantities are entered into the equations as given.

1. Estimate for the Operating Modes 1, 3, 4 and 5:

As explained above, when a gear of the shift transmission is engaged, the electro-mechanical energy converter is tied to the output shaft at a fixed rpm ratio, which enables the electro-mechanical energy converter to supply power to, or extract power from, the output shaft. The required power rating is obtained as the overall maximum amount required to perform any of the operating modes of

- driving under combustion-engine power only;
- driving under the combined power of the combustion engine with the assistance of the electro-mechanical energy converter;
- feeding back energy by operating the electro-mechanical energy converter in a generator mode; and
- feeding back energy recovered from decelerating (braking) the vehicle by means of the electro-mechanical energy converter working in a generator mode.

2. Driving in the Electrically Powered Mode:

The power rating required to run the vehicle under the power of the electro-mechanical energy converter depends on the desired performance level of the vehicle. To merely meet a performance level corresponding to a partial-load operation of the combustion engine (e.g. one-third of the maximum engine torque) a power rating of about 15 kW will be adequate. During short time intervals, it is also permissible to exceed the nominal rating, which would allow a start-up acceleration of the vehicle comparable to the combustion-powered mode.

3.1 Starting the Combustion Engine While the Vehicle is Standing Still (Operating Mode #7):

As explained above, when a gear of the shift transmission is engaged, the electro-mechanical energy converter is tied to the input shaft at a fixed rpm ratio. In operating mode #7, the power output of the electro-mechanical energy converter is directed to the transmission input shaft. To start a diesel engine requires a torque of about 150 newton-meter at about 200 rpm. This translates into a relatively low rpm rate for the electro-mechanical energy converter, so that the power requirement, likewise, is low. However, one has to consider the maximum power value over the entire characteristic curve, so that the power rating of the electro-mechanical energy converter has to lie significantly above the value shown in Table 1. An additional allowance has to be made for the acceleration of the system masses themselves. Since the engine start requires power to be available only during a short time interval, the electro-mechanical energy converter is made to work in a momentary overload mode, provided that the energy converter is of a type that will tolerate this condition.

Under the foregoing conditions, the power rating required for the electro-mechanical energy converter is about 10 kW.

With small Otto-cycle engines, the start-up torque will be correspondingly lower, so that an electro-mechanical energy converter of a lesser power rating will be adequate.

3.2 Starting the Combustion Engine While the Vehicle is Moving:

During a short time interval, the decelerating torque that occurs as a result of starting the combustion engine has to be compensated by the electro-mechanical energy converter. The amount of power required in this case depends on which gear is engaged. High amounts of power are needed for short time periods, so that the estimate leads to a required power rating of about 15 kW.

4. Estimated Power Requirement for Operating Mode #8, i.e., to Bridge Time Gaps in Vehicle Traction:

In an up-shift, the objective is to direct the inertial energy of the combustion engine to the transmission output shaft in order to synchronize the engine with the rpm rate of the new gear to allow a smooth engagement of the shift clutch. In this case, the electro-mechanical energy converter can function as a brake to decelerate the combustion engine. Since vehicle traction is maintained by the electro-mechanical energy converter, the amount of time required for shifting is of less concern. A time interval of about 2.5 sec was assumed in the example of Table 1.

Possible design arrangements for tying the electro-mechanical energy converter to the input and output shafts of a shift transmission by way of a superimposed transmission device (possibly with the interposition of fixed gear stages).

| | Design #1 | | | Design #2 | | | Design #3 | | | Design #4 | | | Design #5 | | | Design #6 | | |
|---|---|---|---|---|---|---|---|---|---|---|---|---|---|---|---|---|---|---|
| | Sun gear | Planet carrier | Ring gear | Sun gear | Planet carrier | Ring gear | Sun gear | Planet carrier | Ring gear | Sun gear | Planet carrier | Ring gear | Sun gear | Planet carrier | Ring gear | Sun gear | Planet carrier | Ring gear |
| Input shaft | X | | | X | | | X | | | | X | | X | | | X | | |
| Output shaft | | X | | | | X | X | | | | X | | | X | | | | X |
| EMC Rotor | | | X | | X | | | | X | X | | | | | X | | X | |

In any of the foregoing design combinations, the rotor of the electro-mechanical energy converter can be arranged concentrically with the input shaft of the shift transmission;
with the output shaft of the shift transmission; or
with an additional shaft.

Figure 13:
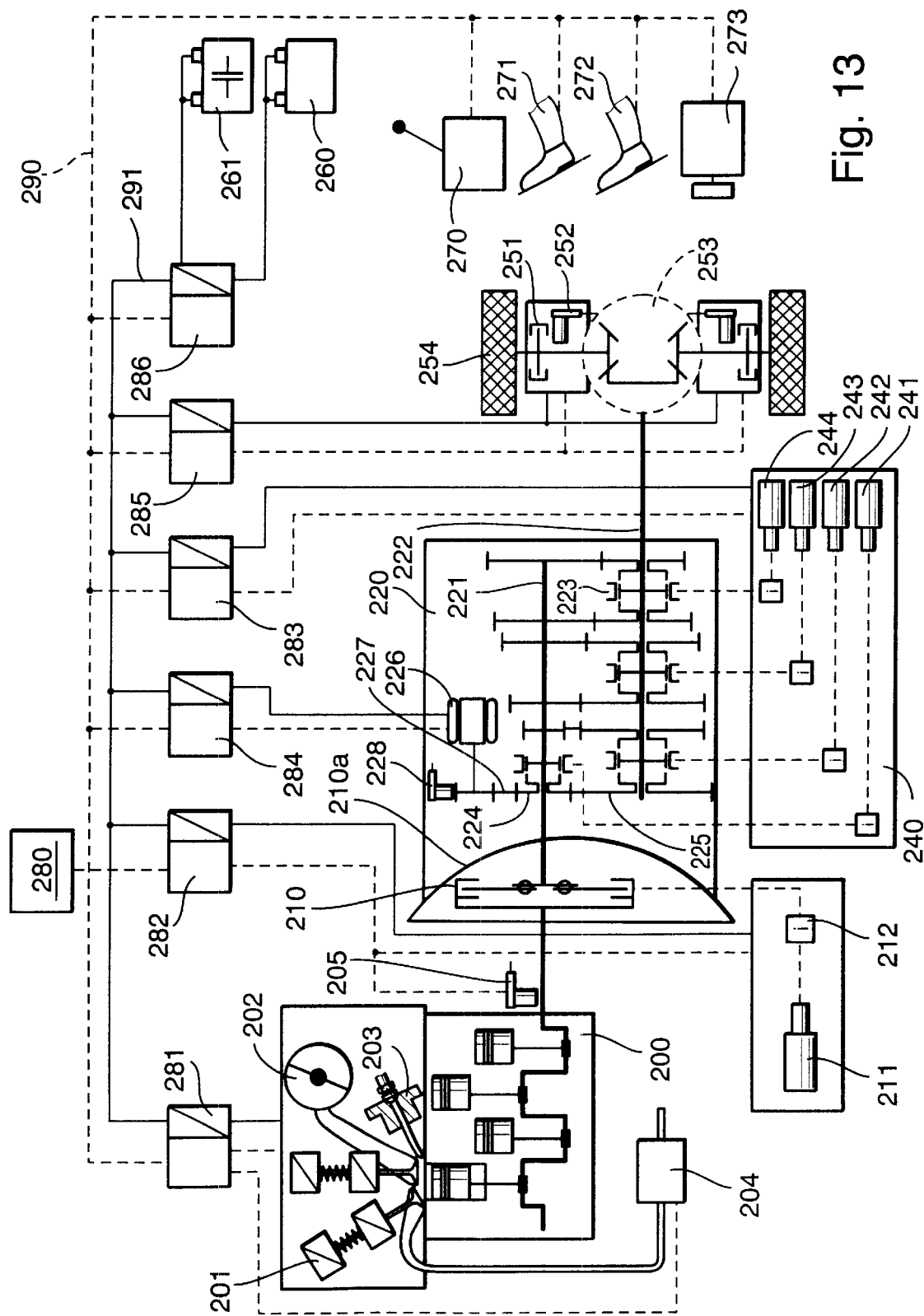
FIG. 13 represents a schematic view of a vehicle.
Figure 14A:
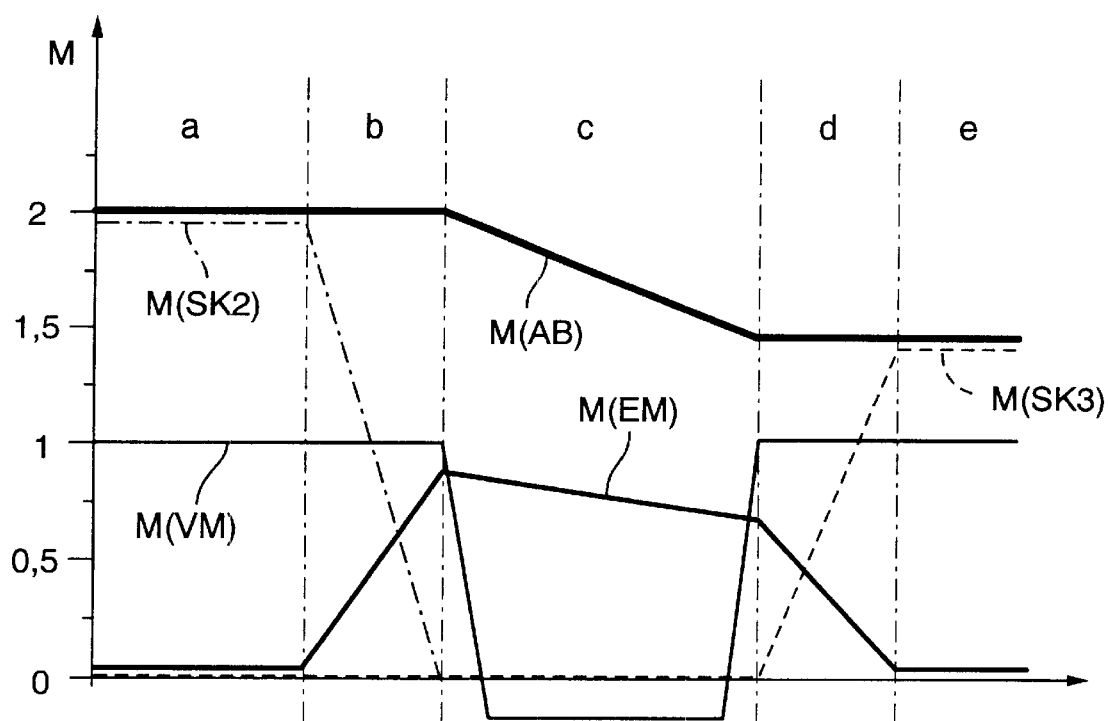
FIGS. 14a through 16b represent graphs of time profiles of a gear-changing process in a motor vehicle.
Figure 14B:
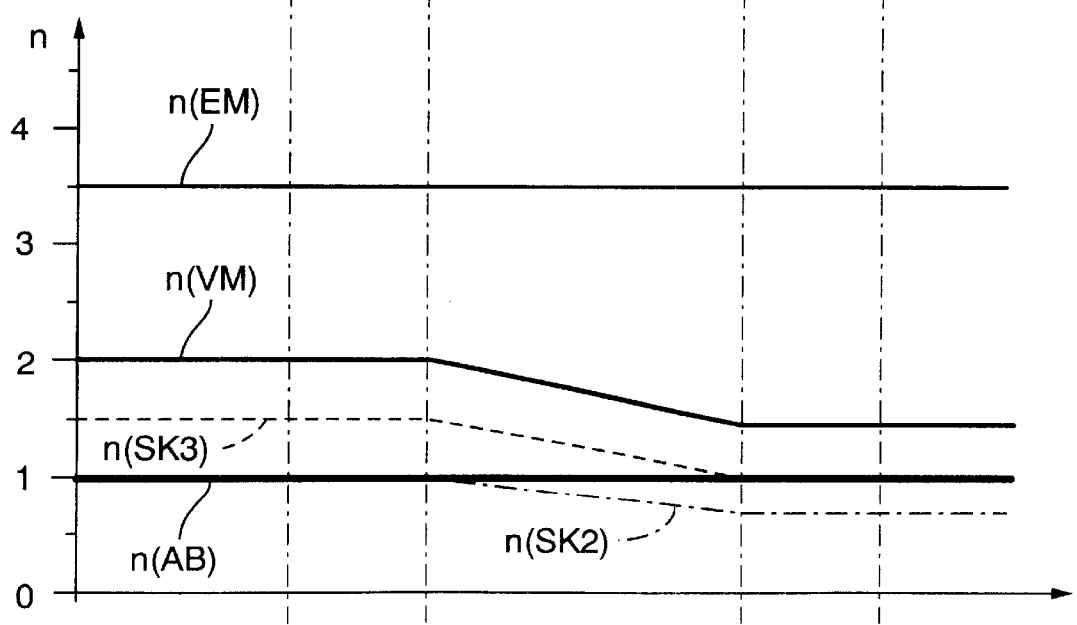

FIG. 13 gives a schematic view of a motor vehicle according to invention with the following elements:

| | |
|---|---|
| 200 | Primary drive source, combustion engine |
| 201 | Engine valves with controlled actuation |
| 202 | Throttle valve and associated actuator |
| 203 | Fuel injection system |
| 204 | Catalytic converter with an oxygen sensor and in certain cases a temperature sensor for the catalytic converter temperature |
| 205 | RPM sensor for the engine rpm rate |
| 210 | Clutch |
| 211 | Clutch actuator |
| 212 | Actuator transfer/reduction element |
| 220 | Transmission |
| 221 | Transmission input shaft |
| 222 | Transmission output shaft |
| 223 | Shift clutches |
| 224 | Shift clutch for input shaft |
| 225 | Gear pair acted on by electro-mechanical energy converter |
| 226 | Electro-mechanical energy converter |
| 227 | Transmission device attached to electro-mechanical energy converter |
| 228 | RPM sensor of the electro-mechanical energy converter |
| 240 | Transmission-actuator system |
| 241 | Actuator to couple gear level 1 to the input shaft |
| 242 | Actuator to couple gear level 1 to the output shaft and to engage reverse gear |
| 243 | Actuator to engage gear levels 2 and 3 |
| 244 | Actuator to engage gear levels 4 and 5 |
| 250 | Power train |
| 251 | Brake |
| 252 | Differential |
| 253 | RPM sensor |
| 254 | Drive wheel |
| 260 | Battery (chemical storage) |
| 261 | Supercap (Capacitative storage) |
| 270 | Driver-operated manual control element |
| 271 | Clutch pedal |
| 272 | Accelerator pedal |
| 273 | Air conditioning compressor |
| 280 | Master control system with electronic control unit |
| 281 | Engine control unit with power electronics |
| 282 | Control unit with power electronics to operate the clutch plate |
| 283 | Control unit with power electronics to operate the transmission actuators |
| 284 | Control unit with power electronics to operate the electro-mechanical energy converter |
| 285 | Control unit with power electronics to operate the anti-lock braking system |
| 286 | Control unit with power electronics to operate the battery |
| 290 | Signal lines/bus (CAN bus) |
| 291 | Power flow |

The diagrams in FIGS. 14a, 14b, 15a, 15b, 16a and 16b represent time profiles of up-shifts performed with the assistance of an electro-mechanical energy converter. As can be seen in the diagrams, the breakdown in traction is reduced by the intervention of the electro-mechanical energy converter.

Based on the diagrams, following is a closer look at an up-shift from second to third gear with traction, using an electro-mechanical energy converter that acts on the output shaft. Time profiles of rpm rate and torque are presented and explained. The fundamental idea behind using the electro-mechanical energy converter is to fill in the time gap in the tractive force during the gear shifts. The phases a–e of a gear-shifting process will be described for three comparable shifting strategies.

Phase a represents the time before the shift process is started. The shift clutch of second gear transmits the engine torque to the output shaft at the transmission ratio of the second gear level. If the shift clutch is engaged between the output and the electro-mechanical energy converter, the latter is coupled directly to the output through the gears of the first gear level. However, during this phase, the electro-mechanical energy converter is not applying a torque to the output. If the shift clutch between the electro-mechanical energy converter and the output is still in a disengaged state during phase a (FIGS. 16 a/b), the electro-mechanical energy converter is accelerated to the synchronized rpm level, and the shift clutch between the electro-mechanical energy converter is engaged.

Figure 15A:
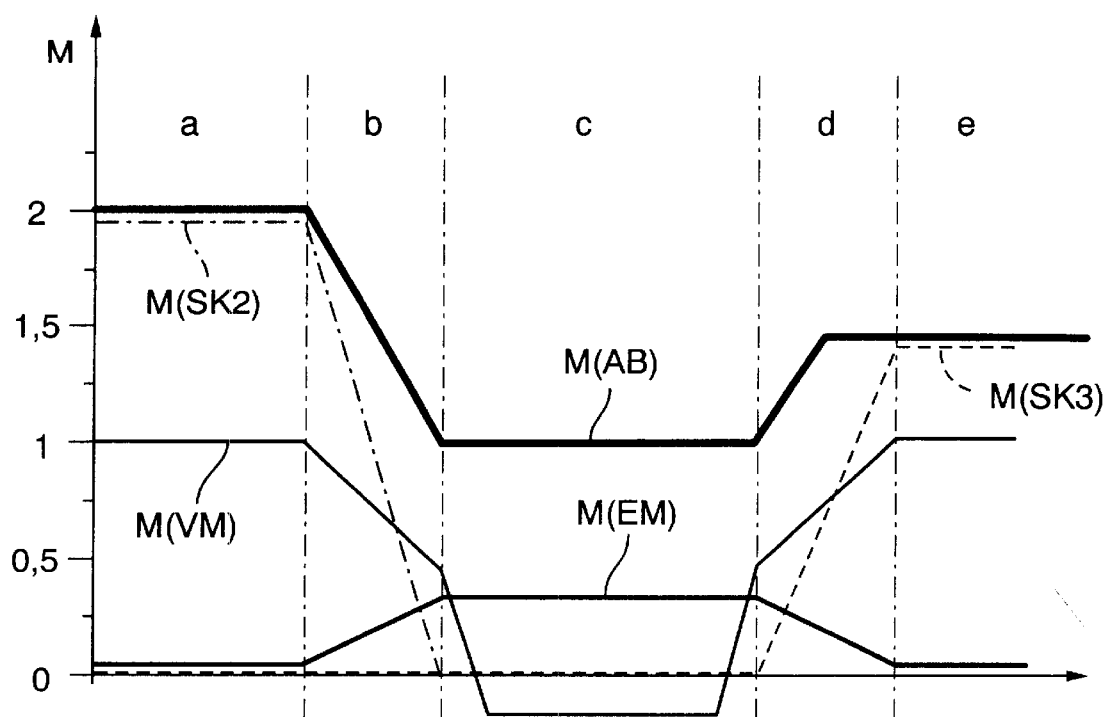
Figure 15B:
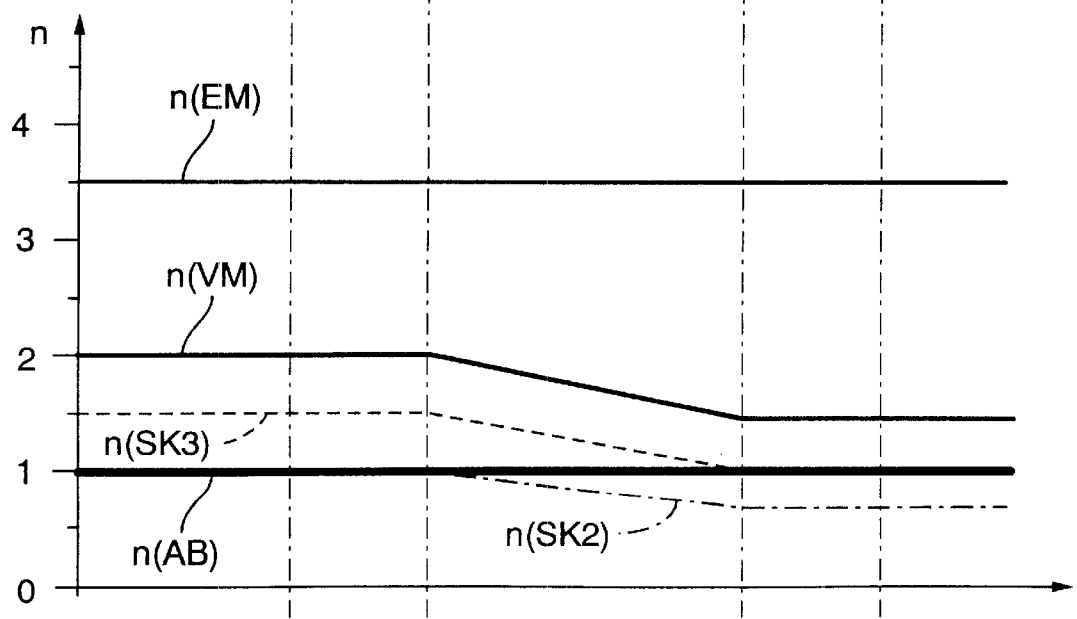
Figure 16A:
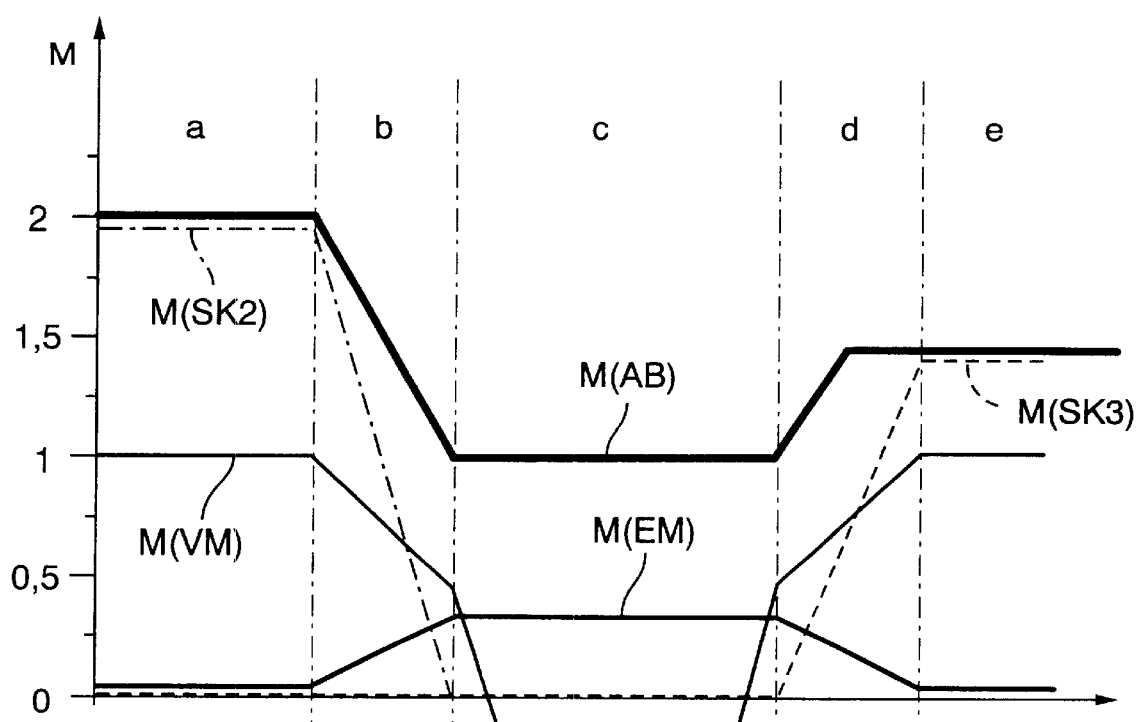
Figure 16B:
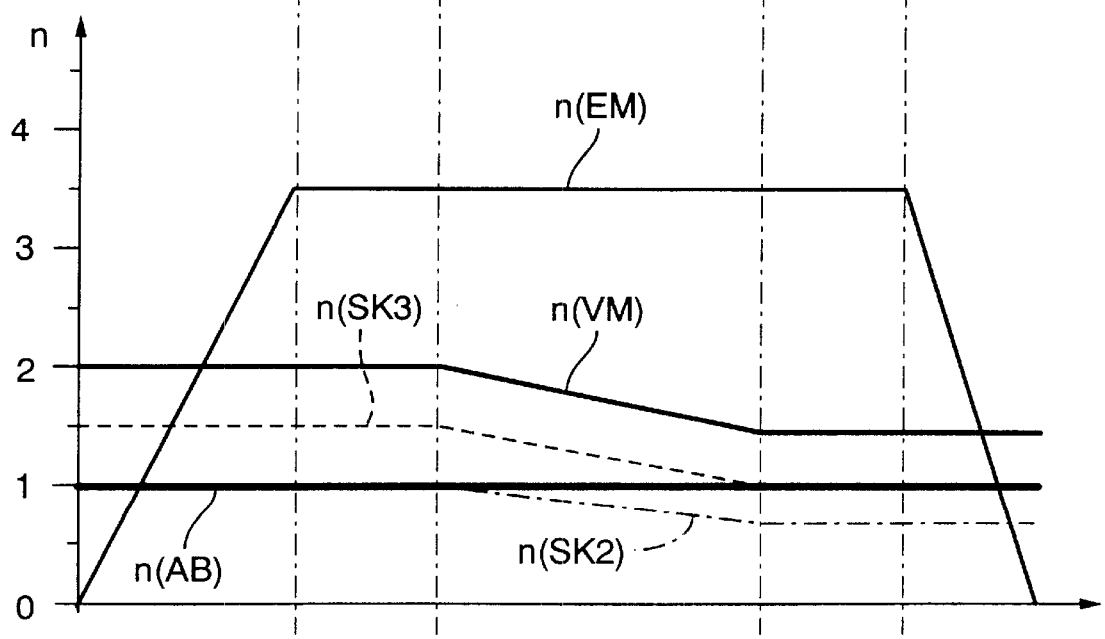

Phase b represents the time interval when the shift process is started. The electro-mechanical energy converter applies torque to the output by way of the first gear level in order to relieve the torque load on the shift clutch of the currently operative gear level. After the torque load on the currently operative gear has been reduced to zero, the respective shift clutch is retracted from engagement, at which point the transmission is ready to start the synchronization phase. The deciding factor is that the currently operative shift clutch must be in a torque-free state in order to be taken out of engagement. The torque-free state can only be realized if the electro-mechanical energy converter is able to replace the torque produced by the combustion engine at the rpm rate that is dictated by the gear level and the vehicle speed. Since the electro-mechanical energy converter, as a rule, cannot deliver the full amount of the power that was delivered to the output by the combustion engine, one possible strategy is to lower the torque of the combustion engine during this phase to a level that the electro-mechanical energy converter will be able to replace in order to ensure a torque-free state of the shift clutch (FIGS. 15a/b).

Phase c represents the time interval during which the combustion engine is synchronized to the appropriate rpm rate. The combustion engine is put into a drag mode and decelerates itself and the transmission input shaft with the available drag torque. The electro-mechanical energy converter is coupled to the output during this phase and supplies the output torque. Dependent on the amount of torque desired by the driver and on the power capacity of the electro-mechanical energy converter, a temporary cutback in traction has to be expected during this phase. However, there will not be a total hiatus in vehicle traction.

Phase d starts when the synchronized rpm rate for the new gear has been reached. The shift clutch SK3 of third gear is moved into engagement. The rpm rate of the engine and the transmission input shaft (that is coupled to the engine) can be regulated through the engine torque. To avoid a jolt from the engagement of the shift clutch, the rpm rate at the new gear level has to be synchronized, and there has to be a torque-free state (i.e., no acceleration of the input shaft while the shift clutch of the new gear is moved into engagement). Subsequently, the torque of the electro-mechanical energy converter is cut back to zero and the engine torque is raised in accordance with the amount of torque desired by the driver.

Phase e represents the state after the shift process has been completed. The combustion engine transmits the engine torque to the output by way of the third gear level. It is possible at this point to uncouple the electro-mechanical energy converter from the transmission output by disengaging the respective shift clutch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Motor vehicle with a power train comprising:
   a combustion engine with a crankshaft;
   a primary transmission with at least two shafts, a first shaft being a transmission input shaft and a second shaft being a transmission output shaft, different transmission ratio being selectable between said shafts through a plurality of gear pairings;
   an engageable/disengageable clutch in a torque flow between the crankshaft and the transmission input shaft; and
   an electro-mechanical energy converter which is arranged surrounding one of the shafts and is further arranged so that it can be coupled to one of the shafts by means of a secondary transmission;
   wherein at least one of said plurality of gear pairings lies in a torque-transmitting path between the electro-mechanical energy converter and the crankshaft.

2. The motor vehicle of claim 1, wherein said torque flow defines upstream and downstream ends and directions in the power train relative to said primary transmission, wherein the combustion engine is located at the upstream end and generates an input quantity, said primary transmission with said input shaft receives the input quantity, said output shaft delivers an output quantity, and the electro-mechanical energy converter is adapted to have a controlling influence on at least one of the input quantity and the output quantity.

3. The motor vehicle of claim 2, wherein the controlling influence dictates a ratio between the input quantity and the output quantity.

4. The motor vehicle of claim 3, comprising a secondary drive control means and a secondary drive source actuator means, wherein the secondary drive source control means directs the secondary drive source actuator means in manipulating the electro-mechanical energy converter.

5. The motor vehicle of claim 2, wherein the input quantity is an input torque and the output quantity is an output rpm rate.

6. The motor vehicle of claim 2, comprising a primary drive source control means adapted to have a controlling influence over the combustion engine.

7. The motor vehicle of claim 2, wherein the secondary transmission includes a planetary gear set arranged to function at least part of the time between the combustion engine and the output shaft, wherein the electro-mechanical energy converter generates a second input quantity and the planetary gear set has at least one rotary element coupled to the electro-mechanical energy converter.

8. The motor vehicle of claim 7, wherein the second input quantity is a second input torque.

9. The motor vehicle of claim 7, wherein the planetary gear set has a sun gear, a ring gear, and planet gears rotatably supported by a planet carrier adapted to rotate at least part of the time about a central sun gear axis, said planetary gear set being arranged substantially parallel to the primary transmission, and wherein at least one of the respective rpm rates of the sun gear, the ring gear, and the planet carrier substantially corresponds to an rpm rate of at least one rotary element of the first transmission, said rpm rate including an input rpm rate and the output rpm rate of the primary transmission.

10. The motor vehicle of claim 7, wherein the planetary gear set is adapted to influence at least one rotary element of the first transmission, said rpm rate including an input rpm rate and the output rpm rate of the primary transmission.

11. The motor vehicle of claim 2, wherein the power train comprises at least two partial power trains arranged to work in parallel.

12. The motor vehicle of claim 11, wherein at least two of the partial power trains each contain a transmission device operable at more than one transmission ratio.

13. The motor vehicle of claim 12, wherein at least one of the transmission devices comprises a planetary gear set.

14. The motor vehicle of claim 2, wherein said combustion engine and electro-mechanical energy converter are adapted to cooperate in a coordinated manner to produce the output quantity.

15. The motor vehicle of claim 14, wherein the electro-mechanical energy converter is operable to work at least part of the time as an electric motor and at least part of the time as an electric generator.

16. The motor vehicle of claim 14, further comprising a secondary transmission and a differential, wherein both the primary transmission and the secondary transmission are arranged in the power train between the combustion engine and the differential.

17. The motor vehicle of claim 16, wherein the primary transmission and the secondary transmission are adapted so that each of them can be set to at least two different transmission ratios.

18. The motor vehicle of claim 16, wherein the primary transmission and the secondary transmission are arranged to work in series.

19. The motor vehicle of claim 16, wherein the primary transmission and the secondary transmission are arranged to work in parallel.

20. The motor vehicle of claim 16, wherein at least one of the primary transmission an d the secondary transmission comprises a gear set of tooth-profiled gear wheels.

21. The motor vehicle of claim 16, wherein at least one of the primary transmission and the secondary transmission comprises a planetary gear set.

22. The motor vehicle of claim 16, comprising at least one clutch operable to actuate at least one of the primary transmission and the secondary transmission.

23. The motor vehicle of claim 22, wherein said at least one clutch is arranged around, and substantially concentric to, a shaft.

24. The motor vehicle of claim 16, wherein the primary transmission comprises an arrangement of externally profiled spur gears and the secondary transmission comprises a planetary gear set with a sun gear, a ring gear, at least one planet gear, and a planet carrier.

25. The motor vehicle of claim 24, wherein the sun gear is coupled through a substantially rotation-locked constraint to a shaft upstream in the power train.

26. The motor vehicle of claim 24, wherein the sun gear is supported substantially free from rotational constraint on a shaft upstream in the power train.

27. The motor vehicle of claim 24, wherein the sun gear is coupled through a substantially rotation-locked constraint to a shaft downstream in the power train.

28. The motor vehicle of claim 24, wherein the sun gear is supported substantially free from rotational constraint on a shaft downstream in the power train.

29. The motor vehicle of claim 24, wherein the planet carrier is coupled through a substantially rotation-locked constraint to at least one shaft upstream in the power train.

30. The motor vehicle of claim 24, wherein the planet carrier is coupled through a substantially rotation-locked constraint to at least one shaft downstream in the power train.

31. The motor vehicle of claim 24, wherein the planet carrier is coupled at least part of the time through at least one gear stage to at least one shaft upstream in the power train.

32. The motor vehicle of claim 24, wherein the planet carrier is coupled at least part of the time through at least one gear stage to at least one shaft downstream in the power train.

33. The motor vehicle of claim 24, wherein the planetary gear set comprises at least one clutch device to open and close a rotation-locking connection between a rotary shaft and at least one of the sun gear and the planet carrier.

34. The motor vehicle of claim 24, wherein the ring gear is coupled through a substantially rotation-locked constraint to at least one shaft upstream in the power train.

35. The motor vehicle of claim 24, wherein the ring gear is coupled through a substantially rotation-locked constraint to at least one shaft downstream in the power train.

36. The motor vehicle of claim 24, wherein the ring gear is arranged in the torque flow between one of the primary and secondary drive source and the at least one planet gear.

37. The motor vehicle of claim 24, wherein the ring gear is electro-magnetically coupled to the electro-mechanical energy converter during at least a part of the time.

38. The motor vehicle of claim 37, wherein the electro-mechanical energy converter comprises a rotor and a stator, and the ring gear is substantially coupled to the rotor.

39. The motor vehicle of claim 38, wherein the ring gear is substantially concentric with the stator.

40. The motor vehicle of claim 24, wherein the planetary gear set is arranged in the power train on an upstream side of the primary transmission.

41. The motor vehicle of claim 24, wherein the planetary gear set is arranged in the power train on a downstream side of the primary transmission.

42. The motor vehicle of claim 24, comprising a start-up clutch arranged in the power train between the combustion engine and the output shaft.

43. The motor vehicle of claim 42, wherein the secondary transmission is arranged upstream of the start-up clutch.

44. The motor vehicle of claim 42, wherein the secondary transmission is arranged downstream of the start-up clutch.

45. The motor vehicle of claim 42, wherein the primary transmission is arranged upstream of the start-up clutch.

46. The motor vehicle of claim 42, wherein the primary transmission is arranged downstream of the start-up clutch.

47. The motor vehicle of claim 42, wherein the primary and secondary transmissions are both arranged on the same side of the start-up clutch in relation to the torque flow.

48. The motor vehicle of claim 42, wherein the primary and secondary transmissions are arranged on different sides of the start-up clutch in relation to the torque flow.

49. The motor vehicle of claim 42, wherein the primary transmission comprises at least one gear-engaging clutch, and wherein the sun gear and the gear-engaging clutch are arranged on one and the same shaft.

50. The motor vehicle of claim 42, wherein the primary transmission comprises at least one gear-engaging clutch, and wherein the sun gear and the gear-engaging clutch are arranged on different shafts.

51. The motor vehicle of claim 42, wherein the start-up clutch comprises a self-adjusting clutch.

52. The motor vehicle of claim 51, wherein the self-adjusting clutch is a force-controlled clutch.

53. The motor vehicle of claim 51, wherein the self-adjusting clutch is a displacement-controlled clutch.

54. The motor vehicle of claim 42, comprising at least one gear-engaging clutch and a control unit operable to control at least one of the gear-engaging clutch, the electro-mechanical energy converter, and the start-up clutch.

55. The motor vehicle of claim 24, wherein the primary transmission comprises an input shaft arranged on an upstream side and the sun gear is concentric with the input shaft.

56. The motor vehicle of claim 55, wherein the sun gear is arranged on the input shaft.

57. The motor vehicle of claim 24, wherein the sun gear is concentric with the output shaft.

58. The motor vehicle of claim 57, wherein the sun gear is arranged on the output shaft.

59. The motor vehicle of claim 24, wherein the planetary gear set comprises at least three planet wheels.

60. The motor vehicle of claim 24, wherein the planet carrier is a deep-drawn punch-cut component.

61. The motor vehicle of claim 24, wherein the ring-gear is a deep-drawn punch-cut component.

62. The motor vehicle of claim 14, wherein the motor vehicle is adapted to be driven by the combustion engine alone during at least part of the time.

63. The motor vehicle of claim 14, wherein the motor vehicle is adapted to be driven by the combustion engine during at least part of the time and the electro-mechanical energy converter is adapted to have a controlling influence over a transmission ratio of the primary transmission.

64. The motor vehicle of claim 14, wherein the motor vehicle is adapted to be driven at least part of the time by the combustion engine and the electro-mechanical energy converter working simultaneously.

65. The motor vehicle of claim 14, wherein the electro-mechanical energy converter is operable at least part-time as an electric generator taking mechanical energy out of the power train and converting it to electrical energy.

66. The motor vehicle of claim 65, wherein the mechanical energy is brake energy generated in decelerating the vehicle.

67. The motor vehicle of claim 14, wherein the motor vehicle is adapted to be driven under electrical power during at least part of the time.

68. The motor vehicle of claim 67, wherein the electro-mechanical energy converter is operable as an electric motor to drive the vehicle in a forward mode at least part of the time.

69. The motor vehicle of claim 67, wherein the electro-mechanical energy converter is operable as an electric motor to drive the vehicle in a reverse mode at least part of the time.

70. The motor vehicle of claim 14, wherein the electro-mechanical energy converter is operable as an electric motor to start the combustion engine while the motor vehicle is standing still.

71. The motor vehicle of claim 14, wherein the electro-mechanical energy converter is operable as an electric motor to start the combustion engine while the motor vehicle is moving.

72. The motor vehicle of claim 14, wherein the primary transmission is a gear-shifting transmission and the electro-mechanical energy converter is operable as an electric motor to supply torque to the power train and thereby at least partially replace a loss in traction during gear shifts.

73. The motor vehicle of claim 14, wherein the electro-mechanical energy converter is operable to at least partially counteract oscillations in the upstream part of the power train.

74. The motor vehicle of claim 14, wherein the electro-mechanical energy converter is operable to at least partially counteract oscillations in the downstream part of the power train.

75. The motor vehicle of claim 14, comprising a starter motor, wherein the electro-mechanical energy converter and the starter motor are both operable to start the combustion engine.

76. The motor vehicle of claim 14, wherein the electro-mechanical energy converter is operable to reverse the sense of rotation transmitted from the combustion engine to the output shaft.

77. The motor vehicle of claim 14, wherein the electro-mechanical energy converter comprises an externally excited electrical machine.

78. The motor vehicle of claim 14, wherein the electro-mechanical energy converter comprises an electrical machine selected from the group that consists of reluctance motors, asynchronous motors, EC motors, DC shunt motors, synchronous motors, and stepper motors.

79. A method of operating the motor vehicle of claim 14, comprising the steps of:
 a) actuating the combustion engine at predetermined points in time according to a first characteristic, and
 b) actuating the electro-mechanical energy converter at predetermined points in time according to a second characteristic,
wherein the vehicle moves in a manner dependent on how intensively the combustion engine is actuated and on how intensively the electro-mechanical energy converter is actuated.

80. A method of operating the motor vehicle of claim 14, comprising the step of operating the electro-mechanical energy converter in a generator mode at predetermined points in time, whereby the electro-mechanical energy converter extracts energy from the power train.

81. The motor vehicle of claim 2, comprising at least one energy-storing device, wherein the combustion engine supplies energy to the power train and the energy-storing device is adapted to extract and store energy from the power train.

82. The motor vehicle of claim 81, wherein the energy-storing device is an electric generator.

83. The motor vehicle of claim 81, comprising means for returning stored energy to the power train at least part of the time.

84. The motor vehicle of claim 2, wherein the combustion engine and the electro-mechanical energy converter are adapted so that at least a part of the time one of the combustion engine and electro-mechanical energy converter can be deactivated from driving the vehicle while the other of the combustion engine and electro-mechanical energy converter can be activated at the same time to drive the vehicle.

85. The motor vehicle of claim 2, wherein the primary drive source and the secondary drive source are adapted so that at least part of the time one of the primary and secondary drive sources can be deactivated from driving the vehicle while the other of the drive sources can be activated at the same time to drive the vehicle.

86. The motor vehicle of claim 85, wherein said combustion engine and electro-mechanical energy converter are arranged to work in series.

87. The motor vehicle of claim 85, wherein said combustion engine and electro-mechanical energy converter are arranged to work in parallel.

88. The motor vehicle of claim 2, wherein the primary transmission comprises a step-wise variable transmission.

89. The motor vehicle of claim 2, wherein the primary transmission comprises a continuously variable transmission.

90. The motor vehicle of claim 2, wherein the primary transmission comprises an automatic transmission.

91. The motor vehicle of claim 2, wherein the primary transmission comprises a gear-shifting transmission.

92. The motor vehicle of claim 91, wherein the gear-shifting transmission is automated.

93. The motor vehicle of claim 2, comprising at least one electronically controlled clutch device.

94. The motor vehicle of claim 2, wherein the power train comprises at least one dual-mass flywheel.

95. The motor vehicle of claim 2, comprising at least one start-up clutch and at least one dual-mass flywheel, the start-up clutch and the dual-mass flywheel being arranged together in one assembly unit.

96. The motor vehicle of claim 95, wherein the start-up clutch and the dual-mass flywheel are substantially bolted together.

97. The motor vehicle of claim 96, wherein the start-up clutch and the dual-mass flywheel are arranged so that one lies radially inside the other.

98. The motor vehicle of claim 2, comprising at least one reverse-drive device operable to reverse a sense of rotation of the output shaft.

99. The motor vehicle of claim 98, wherein the reverse-drive device comprises at least one reverse-drive clutch.

100. The motor vehicle of claim 98, wherein the reverse-drive device comprises a reverse-drive gear set.

101. The motor vehicle of claim 2, wherein the motor vehicle is adapted to recycle brake energy generated in decelerating the vehicle.

* * * * *

UNITED STATES PATENT AND TRADEMARK OFFICE
CERTIFICATE OF CORRECTION

PATENT NO. : 6,502,652 B2
DATED : January 7, 2003
INVENTOR(S) : Andreas Rogg

It is certified that error appears in the above-identified patent and that said Letters Patent is hereby corrected as shown below:

<u>Title page,</u>
Item [75], Inventors, in the Inventor's place of residence, delete "Stockelsdorf" and substitute -- Lubeck --

Signed and Sealed this

Twenty-sixth Day of August, 2003

JAMES E. ROGAN
*Director of the United States Patent and Trademark Office*